(12) United States Patent
Sulieman et al.

(10) Patent No.: US 8,533,166 B1
(45) Date of Patent: Sep. 10, 2013

(54) METHODS AND SYSTEMS FOR ENCODING/DECODING FILES AND TRANSMISSION THEREOF

(75) Inventors: Abdulrahman Ahmed Sulieman, New York, NY (US); Jacob Samuel Bronstein, New York, NY (US)

(73) Assignee: Brevity Ventures LLC, New York, NY (US)

( * ) Notice: Subject to any disclaimer, the term of this patent is extended or adjusted under 35 U.S.C. 154(b) by 0 days.

(21) Appl. No.: 13/354,550

(22) Filed: Jan. 20, 2012

Related U.S. Application Data

(63) Continuation of application No. 13/214,162, filed on Aug. 20, 2011, now abandoned.

(60) Provisional application No. 61/375,521, filed on Aug. 20, 2010.

(51) Int. Cl.
*G06F 17/30* (2006.01)
(52) U.S. Cl.
USPC .......................... 707/693; 709/234; 375/240
(58) Field of Classification Search
USPC ......... 707/802, 803, 693; 709/234; 375/240, 375/254, 285; 386/212, 213, 327, 355
See application file for complete search history.

(56) References Cited

U.S. PATENT DOCUMENTS

| | | | | |
|---|---|---|---|---|
| 5,146,324 | A * | 9/1992 | Miller et al. | 375/240.03 |
| 7,295,608 | B2 * | 11/2007 | Reynolds et al. | 375/240.01 |
| 7,395,321 | B1 * | 7/2008 | Oz et al. | 709/220 |
| 2002/0044600 | A1 * | 4/2002 | Scheirer et al. | 375/240 |
| 2004/0022444 | A1 * | 2/2004 | Rhoads | 382/232 |
| 2004/0044520 | A1 * | 3/2004 | Chen et al. | 704/200.1 |
| 2005/0232497 | A1 * | 10/2005 | Yogeshwar et al. | 382/232 |
| 2006/0239567 | A1 * | 10/2006 | Mitchell et al. | 382/232 |
| 2007/0014536 | A1 * | 1/2007 | Hellman | 386/94 |
| 2008/0037880 | A1 * | 2/2008 | Lai | 382/232 |
| 2009/0112897 | A1 * | 4/2009 | Ordentlich et al. | 707/802 |
| 2010/0020886 | A1 * | 1/2010 | Raveendran et al. | 375/240.27 |

\* cited by examiner

*Primary Examiner* — Shahid Alam
(74) *Attorney, Agent, or Firm* — Greenberg Traurig, LLP

(57) ABSTRACT

In one embodiment, the instant invention includes a computer system that includes at least the following components: a) a first computer that performs, in concurrent manner, at least the following tasks: dividing a computer file into a plurality of segments, compressing segments, and sending the compressed segments to a second computer over a network; b) the second computer that performs, in concurrent manner, at least the following tasks: decompressing the compressed segments and assembling the decompressed segment to reconstruct the computer file, where the compressing task performed by the first computer and the decompressing task performed by the second computer are synchronized and performed concurrently.

4 Claims, 10 Drawing Sheets

METHODS AND SYSTEMS FOR ENCODING/DECODING FILES AND TRANSMISSION THEREOF

RELATED APPLICATIONS

This application is a continuation of U.S. patent application Ser. No. 13/214,162, filed Aug. 20, 2011, now abandoned, which claims the benefit of U.S. provisional application Ser. No. 61/375,521, entitled "METHODS AND SYSTEMS FOR ENCODING/DECODING FILES AND TRANSMISSION THEREOF," was filed Aug. 20, 2010, which both are hereby incorporated by reference herein in their entirety for all purposes.

TECHNICAL FIELD

The present invention relates to methods and systems for enabling compression and transfer of large electronic files from one location to another.

BACKGROUND

Typically, transfer of large size data, from several MBs to several TBs, can take hours over conventional networks, be expensive and strain the network resources. Typically, a transfer of large size data may involve a plurality of recipient computers. Typically, compression of large size data, from several MBs to several TBs, can take hours and may result in loss of some data.

SUMMARY OF INVENTION

One embodiment of the invention is related to methods and systems for enabling a sender computer system to compress/encode at least one electronic file and to initiate a transmission of at least some part of the compressed portion of the file while the compression of the remaining portion of the file is still being performed.

One embodiment of the invention is related to methods and systems for enabling a recipient computer system to begin uncompressing/decoding received portions of a compressed electronic file and/or assembly/manipulate the uncompressed and received portion of the file prior to the recipient computer system receiving the remaining portions of the file (i.e., before the total transmission of the compressed file to the recipient computer system is complete.)

One embodiment of the invention is related to methods and systems for enabling a sender computer system to transmit at least a portion of a compressed/encoded file from the sender computer system to at least one recipient computer system and/or direct a transmission of the compressed/encoded portions of the transmitted file among a plurality of recipient computer systems In some embodiments, the instant invention includes a computer-implemented method that includes at least steps of: a) dividing, by a first computer, a computer file into at least one first segment and a first remainder of the computer file; b) compressing, by a second computer, the at least one first segment wherein, in concurrent manner, the second computer compresses the at least one first segment and the first computer divides the first remainder of the computer file into at least one second segment and a second remainder of the computer file; c) sending, by a third computer, the at least one first compressed segment to at least one recipient machine wherein, in concurrent manner, the third computer sends the at least one first compressed segment, the second computer compresses the at least one second segment, and the first computer divides the second remainder of the computer file into at least one third segment and a third remainder of the computer file; d) receiving, by a fourth computer of the recipient machine, the at least one first compressed segment wherein, in concurrent manner, the fourth computer of the recipient machine receives the at least one first compressed segment, the first computer divides the third remainder of the computer file into at least one fourth segment and a fourth remainder of the computer file, the second computer compresses the at least one third compressed segment, and the third computer sends the at least one second compressed segment; e) decompressing, by a fifth computer of the recipient machine, the at least one first received compressed segment wherein, in concurrent manner, the fifth computer of the recipient machine decompresses the at least one first received compressed segment, the first computer divides the fourth remainder of the computer file into at least one fifth segment and a fifth remainder of the computer file, the second computer compresses the at least one fourth segment, the third computer sends the at least one third compressed segment, and the fourth computer of the recipient machine receives the at least one second compressed segment; f) decompressing, by the fifth computer of the recipient machine, the at least one second received compressed segment wherein, in concurrent manner, the fifth computer of the recipient machine decompresses the at least one second received compressed segment and the fourth computer of the recipient machine receives the at least one third compressed segment and wherein the compressing step and the decompressing are synchronized; and g) assembling, by a sixth computer of the recipient machine, the at least one first decompressed segment and the at least one second decompressed segment to reconstruct the computer file wherein, in concurrent manner, the sixth computer of the recipient machine assembles the at least one first decompressed segment and the at least one second decompressed segment, the fifth computer of the recipient machine decompresses the at least one third received compressed segment, and the fourth computer of the recipient machine receives the at least one fourth compressed segment.

In some embodiments, the compressing, by the second computer, is by at least applying at least one lossless algorithm (e.g., LZMA, Crush, Lz/lb, Lagarith, etc.) and wherein decompressing, by the fifth computer of the recipient machine, is by at least applying the at least one lossless algorithm with which the file has been compressed.

In some embodiments, the instant invention includes a computer-implemented method that includes at least steps of: a) dividing, by a first computer, a computer image file into at least one first segment and a first remainder of the computer file, wherein the at least one first segment comprise a plurality of frames and wherein the computer image file is a video file or an aggregation of static image files; b) compressing, by a second computer, the at least one first segment wherein the compressing includes at least the following steps of: 1) selecting a key frame from the plurality of frames of the at least one first segment, 2) comparing the key frame to each of the remaining frames from the plurality of frames of the at least one first segment, wherein the comparison is performed frame-by-frame based at least in part on: a) actual content of each frame and b) an entire frame basis, 3) encoding, if a standard deviation of all pixel differences in luminance channel between the key frame is less than a pre-determine value, at least one frame of the remaining frames as at least one deference frame, wherein the at least one deference frame identifies at least one difference between the key frame and the encoded frame of the remaining frames, 4) applying lossy compression to the key frame and the deference frames of the plurality of frames of the at least one first segment, wherein the lossy compression is multiscale wavelet compression and comprising Human Visual Systems (HVS) filtering to stretch out tones in the key frame and the deference frames of the plurality of frames of the at least one first segment, and 5) applying, after the lossy compression, a signal to noise ratio processing to the key frame and the deference frames of the plurality of frames of the at least one first segment; and c) decompressing, by a third computer, the plurality of frames of the at least one first segment wherein the decompressing is performed in a inverse order of the compressing steps (c) (1) through (c)(5).

In some embodiments, the instant invention includes a computer-implemented method that includes at least steps of: a) dividing, by a sending computer, a first computer file into at least one first segment and a first remainder of the computer file, wherein the first computer file having a first computer format; b) compressing, by the sending computer, the at least one first segment; c) transmitting, by the sending computer, the at least one first compressed segment to a recipient machine; d) dividing, by a sending computer, the first remainder of the computer file into at least one second segment; e) compressing, by the sending computer, the at least one second segment; f) transmitting, by the sending computer, over a network, the at least one second compressed segment to a recipient computer; g) decompressing, by the recipient computer, the at least one first compressed segment into at least one first decompressed segment; h) transcoding, by the recipient computer, the at least one first decompressed segment into at least one first converted segment having a second computer format; j) decompressing, by the recipient computer, the at least one second compressed segment into at least one second decompressed segment; i) transcoding, by the recipient computer, the at least one second decompressed segment into at least one second converted segment having the second computer format; and k) assembling, by the recipient computer, the at least one first converted segment and the at least one second converted segment into a second computer file having the second computer format, wherein the first computer file and the second computer file have the same content and wherein the first computer format and the second computer format are different. In some embodiments, the steps (h) and (i) are performed in concurrent manner.

In some embodiments, the instant invention includes a computer system that includes at least the following components: a) a first computer that divides a computer file into at least one first segment and a first remainder of the computer file; b) a second computer that compresses the at least one first segment wherein, in concurrent manner, the second computer compresses the at least one first segment and the first computer divides the first remainder of the computer file into at least one second segment and a second remainder of the computer file; c) a third computer that sends the at least one first compressed segment to at least one recipient machine wherein, in concurrent manner, the third computer sends the at least one first compressed segment, the second computer compresses the at least one second segment, and the first computer divides the second remainder of the computer file into at least one third segment and a third remainder of the computer file; d) a fourth computer of the recipient machine that receives the at least one first compressed segment wherein, in concurrent manner, the fourth computer of the recipient machine receives the at least one first compressed segment, the first computer divides the third remainder of the computer file into at least one fourth segment and a fourth remainder of the computer file, the second computer compresses the at least one third compressed segment, and the third computer sends the at least one second compressed segment; e) a fifth computer of the recipient machine that decompresses the at least one first received compressed segment wherein, in concurrent manner, the fifth computer of the recipient machine decompresses the at least one first received compressed segment, the first computer divides the fourth remainder of the computer file into at least one fifth segment and a fifth remainder of the computer file, the second computer compresses the at least one fourth segment, the third computer sends the at least one third compressed segment, and the fourth computer of the recipient machine receives the at least one second compressed segment, wherein, in concurrent manner, the fifth computer of the recipient machine decompresses the at least one second received compressed segment and the fourth computer of the recipient machine receives the at least one third compressed segment, and wherein the compression by the second computer and the decompression by the fifth computer of the recipient machine are synchronized; and g) a sixth computer of the recipient machine that assembles the at least one first decompressed segment and the at least one second decompressed segment to reconstruct the computer file, wherein, in concurrent manner, the sixth computer of the recipient machine assembles the at least one first decompressed segment and the at least one second decompressed segment, the fifth computer of the recipient machine decompresses the at least one third received compressed segment, and the fourth computer of the recipient machine receives the at least one fourth compressed segment. In some embodiments, the second computer applies at least one lossless algorithm (e.g., LZMA, Crush, Lz/lb, Lagarith, etc.) for the compression and wherein the fifth computer of the recipient machine applies the at least one lossless algorithm for the decompression with which the file has been compressed.

In some embodiments, the instant invention includes a computer system that includes at least the following components: a) a first computer that divides a computer image file into at least one first segment and a first remainder of the computer file, wherein the at least one first segment comprise a plurality of frames and wherein the computer image file is a video file or an aggregation of static image files; b) a second computer that compresses the at least one first segment wherein the second computer comprising at least one programmed processor for executing the computer executable program code stored in a memory, wherein the computer executable program code that at least include: 1) code to select a key frame from the plurality of frames of the at least one first segment, 2) code to compare the key frame to each of the remaining frames from the plurality of frames of the at least one first segment, wherein the comparison is performed frame-by-frame based at least in part on: a) actual content of each frame and b) an entire frame basis, 3) code to encode, if a standard deviation of all pixel differences in luminance channel between the key frame is less than a pre-determine value, at least one frame of the remaining frames as at least one deference frame, wherein the at least one deference frame identifies at least one difference between the key frame and the encoded frame of the remaining frames, 4) code to apply lossy compression to the key frame and the deference frames of the plurality of frames of the at least one first segment, wherein the lossy compression is multiscale wavelet compression and comprising Human Visual Systems (HVS) filtering to stretch out tones in the key frame and the deference frames of the plurality of frames of the at least one first segment, and 5) code to apply, after the lossy compression, a signal to noise ratio processing to the key frame and the deference frames of the plurality of frames of the at least one first segment; c) a third computer that decompresses the plurality of frames of the at least one first segment wherein the decompression is performed by the third computer in a inverse order of the compressing steps (c) (1) through (c)(5).

In some embodiments, the instant invention includes a computer system that includes at least the following components: 1) a sending computer having at least one memory region for first storing computer executable program code and at least one first processor for executing the first computer executable program code stored in the at least one first memory region, wherein the first computer executable program code that at least includes: a) code to divide a first computer file into at least one first segment and a first remainder of the computer file, wherein the first computer file having a first computer format, b) code to compress the at least one first segment, c) code to transmit the at least one first compressed segment to a recipient machine, d) code to divide the first remainder of the computer file into at least one second segment, e) code to compress the at least one second segment, and f) code to transmit, over a network, the at least one second compressed segment to a recipient computer; and 2) a recipient computer having at least one second memory region for second storing computer executable program code and at least one second processor for executing the second computer executable program code stored in the at least one second memory region, wherein the second computer executable program code that includes: a) code to decompress the at least one first compressed segment into at least one first decompressed segment, b) code to transcode the at least one first decompressed segment into at least one first converted segment having a second computer format, c) code to decompress the at least one second compressed segment into at least one second decompressed segment, d) code to transcode the at least one second decompressed segment into at least one second converted segment having the second computer format, and e) code to assemble the at least one first converted segment and the at least one second converted segment into a second computer file having the second computer format, wherein the first computer file and the second computer file have the same content and wherein the first computer format and the second computer format are different. In some embodiments, the at least one second processor of the recipient computer executes the codes (c) and (d), in concurrent manner.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

Figure 1:
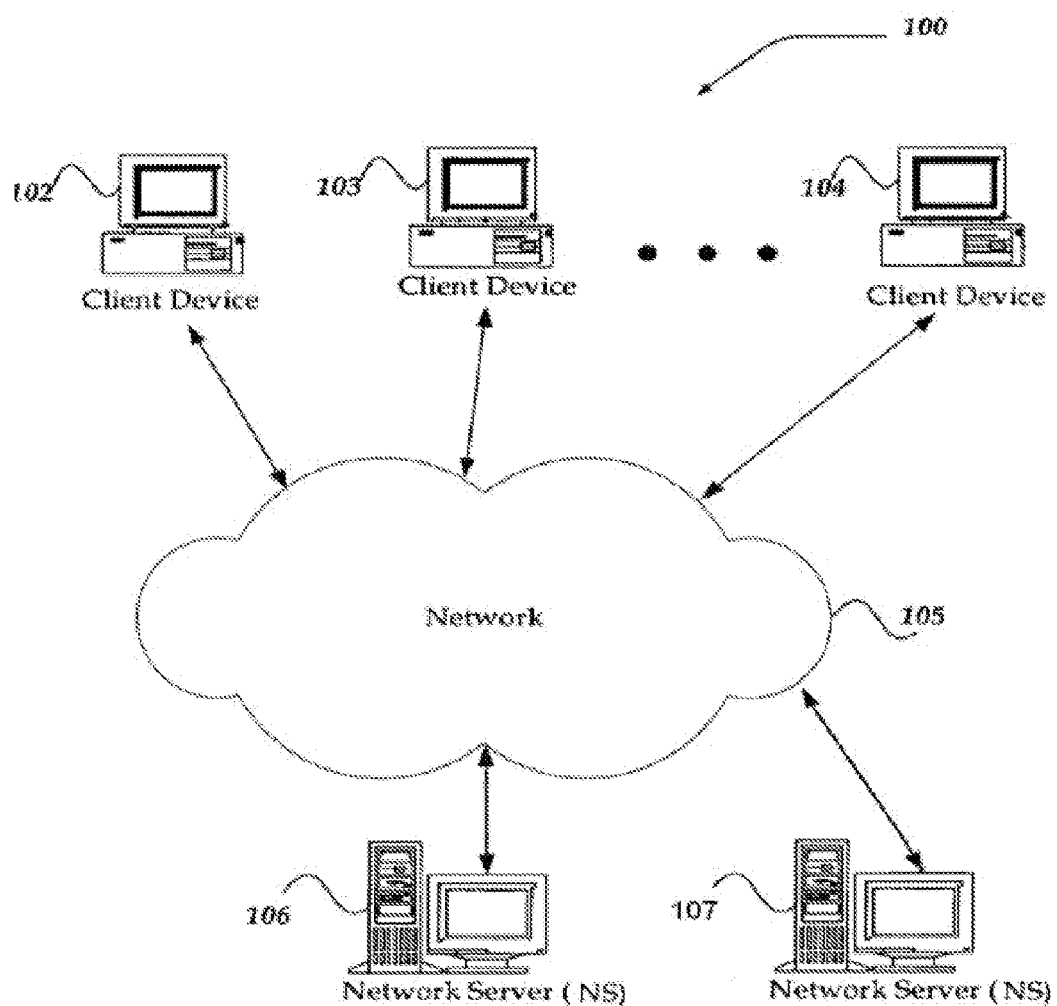
FIG. 1 shows an embodiment of the instant invention.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

For purposes of this description, the terms "compress" and "encode" are used interchangeably and have the same meaning.

For purposes of this description, the term "file," "electronic file," and "data" are used interchangeably and have the same meaning of a physical embodiment of at least one piece of information.

For purposes of this description, the terms "decompress" and "decode" are used interchangeably and have the same meaning.

For purposes of this description, the term "convert" means any manipulation of electronic data by a computer from a first condition into a second condition, where the first condition differs from the second condition in at least one characteristic (e.g., format, size, etc.).

For purposes of this description, the term "data" means a measurable physical state representing at least one character.

In one example, the instant invention is related to methods and systems for breaking a file into primary multiple segments.

In one example, the instant invention is related to methods and systems for compressing those primary segments as they are being broken up.

In one example, the instant invention is related to methods and systems that apply a compression algorithm or a combination of compression algorithms to those primary segments, based on what has been determined to be appropriate to a particular format of a file from which those primary segments have originated.

In one example, the instant invention is related to methods and systems for sending the compressed primary segments by various means in accordance with one or more principles of the Brevity Protocol ("BP").

In one example of the instant invention, prior to being sent, the compressed primary segments are further broken up into secondary segments.

In one example of the instant invention, the primary and/or secondary segments are compressed prior to being transmitted over an electronic network to recipient(s) by various suitable methods without relying on one or more BP principles.

In one example, the instant invention is related to methods and systems for uncompressing the primary and/or secondary segments by received by recipient(s) as those segments come in and then reconstruct the original file from those segments.

In one example, the instant invention is related to methods and systems that use parallel processing to ensure that the compression and decompression is performed by sender computer system(s) and recipient computer system in a significantly short period of time (e.g., several folds less) than it would otherwise take without the instant invention.

In one example, the methods and systems of the instant invention allow a user to select a type of compression. In one example, methods and systems of the instant invention automatically select a type of compression based on characteristic(s) of data (e.g., file) to be sent.

In one example, for uncompressed video files, the instant invention may provide a functionality to compress these files using "Warp Send" methods. In one example, according to at least some "Warp Send" methods, prior to compression, an uncompressed video file can be broken up into blocks/segments of about 500 frames per block/segment which are then packaged for network delivery. In one example, according to at least some "Warp Send" methods, prior to compression, an uncompressed video file can be broken up into blocks/segments of between about 5 to 1000 frames per block/segment which are then packaged for network delivery. In one example, according to at least some "Warp Send" methods, an uncompressed video file can be broken up into blocks/segments of between about 50 to 1000 frames per block/segment which are then packaged for network delivery. In one example, according to at least some "Warp Send" methods, prior to compression, an uncompressed video file can be broken up into blocks/segments of between about 100 to 500 frames per block/segment which are then packaged for network delivery. In one example, a number of frames per block/segment can be kept constant and independent from type and/or size of the original (initial) file or data. In one example, the segment size (e.g., bytes, kbytes, etc.) may vary from one video file to another based on specific characteristics, such as resolution and/or bit rate.

In one example, the "Warp Send" methods and systems of the present invention use at least one Warp algorithm and/or a combination of Warp algorithms to compress/encode a file, such as video file, with reliable visually lossless quality to compress the video file to a fraction of its original size (e.g., less than about 50% of the original size, less than about 25% of the original size, less than about 10% of the original size, less than about 5% of the original size, less than about 3% of the original size, less than about 1% of the original size.) In one example, Warp algorithms at least include a Warp compression processing of video files which is based at least in part on encoding video files on the frame-by-frame basis and a full-frame basis (i.e., processing entire frames by analyzing each frame's visual content as a whole—without subdividing each frame into subareas). In one example, the Warp compression of the video files can includes analyzing inter-frame visual pattern similarities and/or differences. In one example, the Warp compression of the video files can includes analyzing intra-frame visual pattern similarities and/or differences.

In one example, in addition to using the inter-frame and/or intra-frame methods, the Warp compression algorithms/methods further use at least one lossless compression algorithm/method, such as a modified LZ/zlib lossless compression method. In one example, the lossless compression algorithm can exploit statistical redundancy in such a way as to represent the sender's data more concisely without error. In one example, lossless compression is based at least in part on statistical redundancy.

In one example, the "Warp Send" methods and systems of the present invention can use Lempel-Ziv (LZ) compression methods for lossless compression and storage. In one example, the "Warp Send" methods and systems of the present invention use DEFLATE compression methods which can be optimized based at least in part on decompression speed and/or compression ratio. In one example, the "Warp Send" methods and systems of the present invention can use LZR (LZ-Renau) compression methods. In one example, the LZ compression methods can utilize a table-based compression model where table entries are substituted for repeated strings of data. In one example, the compression table can be generated dynamically from earlier data of the file that is being compressed, another file/data that has been already compressed, and/or be pre-determined without prior knowledge about specific data to be compressed but determined based at least in part on data's format, size, resolution, etc. (e.g., the compression table is pre-determined by knowing that it is a video file in MOV format, 1 GB size, HD resolution, and shot in color, and the compression table is not based on whether it is a movie about lions in African Safari or a movie "Taxi Driver" with Robert De Niro).

In one example, the compression table itself can be Huffman encoded (e.g. SHRI, LZX). In one example, LZ-based coding scheme can be LZX.

In one example, the "Warp Send" methods and systems of the present invention can use probabilistic models, in which predictions are coupled to an algorithm (e.g., Arithmetic coding). In one example, the Arithmetic coding (http://en.wikipedia.org/wiki/Arithmetic_coding) can be preferred for files/data whose patterns can be predicted due to their strong context-dependency.

The examples of lossless data compression methods that can be used in some embodiments of the instant invention include, but not limited to, at least one of the following methods:

Data deduplication
run-length encoding
dictionary coders
LZ77 & LZ78
LZW
Burrows-Wheeler transform
prediction by partial matching (also known as PPM)
context mixing
Dynamic Markov Compression (DMC)
entropy encoding
Huffman coding (simple entropy coding; commonly used as the final stage of compression)
Adaptive Huffman coding
Shannon-Fano coding
arithmetic coding (more advanced)
range encoding (same as arithmetic coding, but looked at in a slightly different way)
Golomb coding (simple entropy coding for infinite input data with a geometric distribution)
universal codes (entropy coding for infinite input data with an arbitrary distribution)
Elias gamma coding Fibonacci coding
Slepian-Wolf coding (SWC)(lossless Distributed source coding (DSC))
[edit] Audio
Waveform audio format—WAV
Free Lossless Audio Codec—FLAC
Apple Lossless—ALAC (Apple Lossless Audio Codec)
apt-X Lossless
ATRAC Advanced Lossless
Audio Lossless Coding—also known as MPEG-4 ALS
MPEG-4 SLS—also known as HD-AAC
Direct Stream Transfer—DST
Dolby TrueHD
DTS-HD Master Audio
Meridian Lossless Packing—MLP
Monkey's Audio—Monkey's Audio APE
OptimFROG
RealPlayer—RealAudio Lossless
Shorten—SHN
TTA—True Audio Lossless
WavPack—WavPack lossless
WMA Lossless—Windows Media Lossless
[edit] Graphics
JBIG2
JPEG-LS
JPEG 2000
JPEG XR—formerly WMPhoto and HD Photo
PGF—Progressive Graphics File
PNG—Portable Network Graphics
TIFF—Tagged Image File Format
Gifsicle (GPL) Optimize gif files
Jpegoptim (GPL) Optimize jpeg files
[edit] 3D Graphics
OpenCTM—Lossless compression of 3D triangle meshes
[edit] Video
Animation codec
CorePNG
Dirac—Has a lossless mode.
FFV1
JPEG 2000—(e.g. J2K)
Huffyuv
Lagarith
MSU Lossless Video Codec
SheerVideo.

In one example, the "Warp Send" compression methods can additionally use lossy data compression or perceptual coding, if some loss of fidelity (fidelity or compression fidelity is a measure of quality/context difference(s) between of an initial/original file and a file decoded after undergoing compression in accordance with the instant invention) is acceptable. In one example, the level of acceptable fidelity is based on research on how people perceive the data in question. For example, the human eye is more sensitive to subtle variations in luminance than it is to variations in color. In one example, the lossy data compression may work by "rounding off" some of less-important information. In one example, the lossy data compression provides a way to obtain the best fidelity for a given amount of compression. In some cases, transparent (unnoticeable) compression is desired; in other cases, fidelity is sacrificed to reduce the amount of data as much as possible. In one example, the instant invention provides a user with a functionality to choose lossy schemes of compression over lossless schemes of compression when the exact fidelity during the compression/decompression process may not be needed. In one example, the instant invention provides a functionality to determine if using lossy schemes may result in higher compression and, consequently, in faster transmission of the original file over the inventive methods that use lossless compression.

In one example, the fidelity is determined based on percentage point deference(s) between initial characteristics prior to compression and resulting characteristics after decoding the compressed data (e.g., 2% loss of red hue, 5% loss of top frequency (Hz), 1% loss in sharpness, etc.)

In one example, the instant invention can use lossless compression algorithms/methods for files/data representing executable programs, text documents, source code, and other similar files/data that require to maintain the full or almost full content integrity. In one example, the invention can use lossless compression schemes for image file formats, like PNG or GIF, and use either lossless or lossy methods for other files like TIFF and MNG. In one example, the invention can use the lossless compression for audio files.

In one example, the "Warp Send" methods and systems of the present invention can be fully pipelined, and the combined bit (data) stream will transfer as its being encoded. In one example, the "Warp Send" compression algorithm(s) is (are) capped to encode a frame in less than 0.001 seconds. In one example, the "Warp Send" compression algorithm(s) is (are) capped to encode a frame in less than 0.010 seconds. In one example, the "Warp Send" compression algorithm(s) is (are) capped to encode a frame in less than 0.005 seconds. In one example, the "Warp Send" compression algorithm(s) is (are) capped to encode a frame in less than 0.0005 seconds. In one example, with respect, for example, to a video file, the "Warp Send" compression algorithm can examine a quality of an image during the encoding period to determine if leftover bits can or should be utilized but, only if extra bits are available. In one example, the "Warp Send" compression methods and systems of the present invention can first attempt to find contiguous segment computer graphic overlays from video by detecting contiguous static regions between frames.

In one example, contiguous static regions" are actual content (e.g., depiction of sea water in a movie) that does not substantially change over a plurality of frames. In one example, contiguous static regions" are data (e.g., depiction of sea water in a movie) that experiences a variation of less than 5% percent over a plurality of frames. In one example, contiguous static regions" are data (e.g., depiction of sea water in a movie) that experiences a variation of less than 1% percent over a plurality of frames. In one example, contiguous static regions" are data (e.g., depiction of sea water in a movie) that experiences a variation of less than 3% percent over a plurality of frames. In one example, contiguous static regions" are data (e.g., depiction of sea water in a movie) that experiences a variation of less than 10% percent over a plurality of frames.

In one example, after the contiguous static regions are determined, the "Warp Send" compression methods and systems of the present invention then apply a lossless compression method to these regions. In one example, using the Warp Send compression methods and systems of the present invention allows to eliminate the possibility of artifacts in a visually sensitive area (e.g. static synthetic text and graphics). In one example, after the contiguous static regions have been detected and processed, the remainder of a frame can be sub-sampled across all planes to, for example, 8:4:3 of Y:U:V or R:G:B sampling ratios (a sampling ratio refers to a value or set of values at a point in time and/or space; a sampler is a subsystem or operation that extracts samples from a continuous signal; a theoretical ideal sampler produces samples equivalent to the instantaneous value of the continuous signal at the desired points) by creating a target bit rate (a desired amount of data (e.g., bits) transferred per unit of time, usually measured per second (can be measured during any time period, and will use non-integer JPEG 2000(j2k) compression near 7:1 (visually lossless). In one example, J2K will not be used for regions already compressed by the lossless method. In one example, frames can be grouped together in a block/segment size of 500 frames in a group for sending.

In one example, the "Warp Send" compression methods and systems of the present invention can employ floating-point calculations to accelerate the Warp compression/decompression processing. In one example, the "Warp Send" compression methods and systems of the present invention can employ matrix and vector operations to accelerate the Warp compression/decompression processing. In one example, to increase the compression fidelity, the "Warp Send" compression methods and systems of the present invention can employ programmable shaders which can manipulate vertices and textures, oversampling and interpolation techniques to reduce aliasing, and high-precision color spaces. In one example, to increase the compression fidelity in compression of video data, the "Warp Send" compression methods and systems of the present invention can employ, for example, at least one of the following techniques:

Motion compensation (mocomp)
Inverse discrete cosine transform (iDCT)
Inverse telecine 3:2 and 2:2 pull-down correction
Inverse modified discrete cosine transform (iMDCT)
In-loop deblocking filter
Intra-frame prediction
Inverse quantization (IQ)
Variable-Length Decoding (VLD), more commonly known as slice-level acceleration
Spatial-temporal deinterlacing and automatic interlace/progressive source detection
Bitstream processing (CAVLC (Context-adaptive variable-length coding)/CABAC (context-based adaptive binary arithmetic coding)).

In one example, with respect to processing video files/data, the file/data formats that are supported by the "Warp Send" methods and systems of the present invention include, but not limited to, at least one of the following video formats: Quicktime, Mpeg 2, Mpeg 4, and Avi.

In one example, the "Warp Send" methods and systems of the present invention take the difference between frames and if the standard deviation of the difference is within tolerance (<5), Warp compression algorithms encode the delta; otherwise Warp compression algorithms encode the original frame. In one example, if the standard deviation is greater than a threshold (40), Warp compression algorithms subsample the frame by a factor of 1.5. In one example, Warp compression algorithms encode the delta or original frame to the specified bitrate. In one example, Warp compression algorithms encode delta frames to a lower bitrate (can be several folds less) than original frames. In one example, Warp compression algorithms encode applying wavelet+mq coding, similar to jpeg2000.

In one example, applying the "Warp Send" compression methods and systems of the present invention can reduce an uncompressed video file by about 95% and more. In one example, applying the "Warp Send" compression methods and systems of the present invention can reduce an uncompressed video file by about 75% and more. In one example, applying the "Warp Send" compression methods and systems of the present invention can reduce an uncompressed video file by about 80% and more. In one example, applying the "Warp Send" compression methods and systems of the present invention can reduce an uncompressed video file by from about 5% to about 99%. In one example, applying the "Warp Send" compression methods and systems of the present invention can reduce an uncompressed video file by from about 25% to about 85%. In one example, applying the "Warp Send" compression methods and systems of the present invention can reduce an uncompressed video file by from about 50% to about 99%.

In one example, for uncompressed video files, compressed video, and/or non-video files, the instant invention may provide a functionality to further compress these files using "Archive Send" compression methods and systems. In one example, according to at least some "Archive Send" methods of the instant invention, prior to the "Archive Send" compression, an original file (e.g., uncompressed video file/data, compressed (by a method of the instant invention or another method) video file/data, non-video file/data) can be broken up into blocks/segments of certain size (e.g., 4 KB (kilobyte)) and packaged for network delivery. In one example, according to at least some "Archive Send" methods of the instant invention, prior to the "Archive Send" compression, the original file can be broken up into between about 1 KB to 10 KB blocks/segments and packaged for network delivery. In one example, according to at least some "Archive Send" methods of the instant invention, prior to the "Archive Send" compression, the original file can be broken up into between about 2 KB to 7 KB blocks/segments and packaged for network delivery. In one example, according to at least some "Archive Send" methods of the instant invention, prior to the "Archive Send" compression, the original file can be broken up into between about 3 KB to 6 KB blocks/segments and packaged for network delivery. In one example, a particular size of each block/segment can be constant and independent from a type and/or size of the original file. In one example, the block/segment size (bytes) can vary from one file to another based at least in part on file specific characteristics (e.g., video files: resolution, bit (data) rate, etc.)

In one example, at least some "Archive Send" compression methods of the instant invention are used to encode/compress any type of file/data (e.g., video, audio, xls, etc) with lossless compression. In one example, using at least some "Archive Send" methods of the instant invention allows for at least 2% overall size reduction of a file of any format and/or size. In one example, in accordance with the instant invention, a greater percent reduction in the file size by using "Archive Send" compression methods can be achieved for uncompressed files versa partially or fully compressed files. In one example, previously compressed files can show the file size unaltered or even slightly increased if heavy compression was previously applied.

In one example, if a file is an uncompressed video format file, then at least some "Archive Send" compression methods of the instant invention can first apply at least one Lagarith algorithm (a lossless video codec intended for editing and archiving) at the start of the compression processing. In one example, the Lagarith algorithm first uses a median filter, then, the resulting data stream is checked against a run length encoding algorithm to see if any compression gains can be utilized. In one example, the instant invention employs the median prediction to compress contiguous static scenes identified over a group of frames. In one example, the instant invention detects null frames (mathematically identical frames), discarding at least some of them. In one example, the resulting data stream is additionally compressed using at least one Arithmetic compression. In one example, all operations of the median filter are performed in parallel, and there can be additional parallelism changes around every frame.

In one example, the Lagarith compression processing is able to operate in several colorspaces (e.g, RGB24, RGB32, RGBA, YUY2, and YV12.) In one example, for DVD video files, the compression can be typically about 10-30% better than Huffyuv. In one example, for high static scenes or highly compressible scenes, the Lagarith compression processing can outperform Huffyuv. In one example, according to some "Archive Send" methods of present invention, in applying the Lagarith compressions to video files, the pixel values are first predicted using the median prediction. In one example, the data (byte) stream may be further subjected to a modified Run Length Encoding if the instant invention determines that using the modified Run Length Encoding can result in better compression (e.g., higher compression fidelity and/or larger file size reduction). In one example, the resulting byte stream from that can be further compressed using the Arithmetic compression, which can use fractional bits per symbol. In one example, applying the Lagarith compression can allow the compressed size to be very close to the entropy of the data and avoid expanding high static video. In one example, the Lagarith compression has support for null frames: if the previous frame is mathematically identical to the current, the current frame is discarded and the decoder simply uses the previous frame again.

In one example, the instant invention uses a LZ/zlib library to convert the file into 4 KB (Kilobytes) blocks/segments (Modified LZ compression methodology). In one example, the size of the block depends at least on a rate for parallelism processing. In one example, the size of the block varies as previously detailed. In one example, zlib is a software library used for data compression. In one example, zlib incorporates Deflate, a lossless data compression algorithm, that uses a combination of the LZ78 algorithm (forward scanning the input buffer, matching it against a dictionary it maintains and replacing portions of the data with references to matching data) and Huffman coding (a variable-length code table for encoding a source symbol (such as a character in a file) where the variable-length code table has been derived in a particular way based on the estimated probability of occurrence for each possible value of the source symbol).

In one example, in least some of the "Archive" methods, the compression is achieved through two steps process. In one example, the first step is the matching and replacing duplicate textual (e.g., text, number(s)) strings with pointers (pointer: an address embedded within the data that specifies the location of data in another record or file; or a variable that holds the address of another variable or the address of the beginning of an array of variables, when a pointer to an array is used, it is made to point to any element in the array by incrementing or decrementing its contents (incrementing or decrementing the address)). In one example, the second step is replacing symbols (non-textual (e.g., not text and/or number(s)) elements) with new, weighted symbols based on frequency of use. In one example, the LZ/zlib algorithms is based off a dictionary coder that is created based on the data being compressed (dictionary coder is a class of lossless data compression algorithms which operate by searching for matches between the text to be compressed and a set of strings contained in a data structure (called the "dictionary") maintained by the encoder; when the encoder finds such a match, it substitutes a reference to the string's position in the data structure).

In one example, the "Archive Send" methods and systems of the present invention utilizes Custom Generalized Lossless Compression method ("Crush algorithm") to compress segments for transmission. In one example, the Crush algorithm can be based on Lagarith algorithm. In one example, the Crush algorithm can be based on one or more lossless compressions algorithms that are previously identified.

In one example, the "Archive Send" methods and systems of the present invention support all file formats that one skilled person in the art would know. In one example, applying the "Archive Send" methods and systems of the present invention can reduce the size of uncompressed files on an average by 70%-85%. In one example, applying the "Archive Send" methods and systems of the present invention can reduce size of uncompressed files on an average by 10%-85%. In one example, applying the "Archive Send" methods and systems of the present invention can reduce the size of uncompressed files on an average by 25%-50%. In one example, applying the "Archive Send" methods and systems of the present invention can reduce the size of uncompressed files on an average by 50%-90%. In one example, applying the "Archive Send" methods and systems of the present invention can reduce the size of uncompressed files on an average by 30%-85%.

In one example, when the instant invention receives/obtains a file, the methods and systems of the instant invention determine the received/imported file type. In one example, if the file is an uncompressed video file, the instant invention provides a functionality to choose between the "Warp Send" and "Archive Send" compression methodologies. In one example, if the received file/data is an already compressed video or a non-video file, then the inventive system may automatically process the file in accordance with the "Archive Send" methodology. In one example, if a user attempts to send the file using the "Archive Send" methodology, the instant invention may generate a warning, informing that the "Archive Send" can be used only be used for uncompressed video files.

After the compression step and during the network delivery step, the methods and systems of the instant invention can further segment the compressed primary blocks/segments into network delivery blocks ("NDBs") which are secondary blocks/segments of a smaller size transferred over a computer network. In one example, if there is only a single recipient, the instant invention does not break blocks/segments into NDBs. In one example, NDBs can have a size of 100 Kb (Kilobits). In one example, NDBs can have a size that ranges from about 100 Kb to 1000 Kb. In one example, NDBs can have a size that ranges from about 250 Kb to 750 Kb. In one example, NDBs can have a size that ranges from about 400 Kb to 600 Kb. In one example, NDBs can have a size that ranges from about 50 Kb to 1000 Kb. In one example, the size of NDBs is independent from a number of potential recipients and/or a bandwidth for the transmission.

In one example, the methods and systems of the instant invention can allow for a continuous process flow. In one example, when a first primary block/segment is created, by either, for example, "Warp Send" or "Archive Send" methodologies, the instant invention, at the substantially real-time (e.g., several milliseconds), packages the compressed primary block/segment for the network delivery by further segmenting it into NDBs, and sending each NDBs to each target destination. In one example, when a first NDS arrive at a first destination, the instant invention decodes NDBs, substantially real-time (e.g., several milliseconds), into a portion of the primary block/segment, and, as other NDBs arrive that correspond to other portions of the same primary block/segment and/or to other blocks/segments, the instant invention assembles and decodes the recreated primary blocks/segments into the received transmitted file/data. In one example, the instant invention awaits the arrival of all NDBs for each particular primary segments and then assembles them into the primary segment that is then decoded.

In one example, it can take methods and systems of the instant invention on average about 10-15 milliseconds (can not include network travel time) to create, compress, transmit, and decompress each primary segment after the initial transfer begins. In one example, it can take methods and systems of the instant invention on average about 1-15 milliseconds (can not include network travel time) to create, compress, transmit, and decompress each primary segment after the initial transfer begins. In one example, it can take methods and systems of the instant invention on average about 1-50 milliseconds (can not include network travel time) to create, compress, transmit, and decompress each primary segment after the initial transfer begins. In one example, it can take methods and systems of the instant invention on average about 0.1-50 milliseconds (can not include network travel time) to create, compress, transmit, and decompress each primary segment after the initial transfer begins. In one example, the time that the methods and systems of the instant invention take to create, compress, transmit, and decompress each primary segment after the initial transfer begins depends at least in part on characteristic(s) of processing power.

In one example, the methods and systems of the instant invention allow, at a recipient computer system, to contemporaneously decode (e.g., uncompress) the received blocks/segments and reassemble the decoded blocks/segments into the transmitted file (i.e., the receiving, decoding and reassembling processes are performed in parallel—as blocks/segments are received, they are decoded, and assembled together without waiting until all blocks/segments of the original file arrive at the recipient computer system).

With respect to files that have been compressed using "Warp Send" methods. In one example, at the recipient, the instant invention allows to decode the combined bit (data) stream of blocks/segments) as it is being received. In one example, with respect to video files, the instant invention allows, at a recipient computer system, to decode the received blocks/segments that have been compressed using both lossless and j2k algorithms and combine them into each frame. In one example, the instant invention applies interpolation to expand j2k compression during the decoding process and cubic b-spline interpolation to all planes to restore blocks/segments to their original size.

With respect to files that have been compressed using "Archive Send" methods. In one example, at the recipient, the instant invention uses the same dictionary coder that has been utilized for compression (encode) step to uncompress (decode) the 4 KB blocks on the fly. In one example, at the recipient, the instant invention performs the decoding step by first reading in an index from the dictionary, finding the index in the dictionary, and outputting the substring associated with the index. In one example, the index value points to a string in the dictionary. In one example, the first character of this substring is concatenated to the current working string. In one example, this new concatenation is added to the dictionary (re-simulating how the substrings were added during compression). In one example, the decoded string then becomes the current working string (the current index, i.e. the substring, is remembered), and the process repeats.

In one example, at a recipient, the methods and systems of the instant invention allow to reassemble the original file by decoding each individual segment, substantially real-time (e.g., several milliseconds), upon arrival, while being placed into the proper order of the original file, even if the particular segment has arrived out of the correct order.

In one example, the methods and systems of the instant invention allow, at a recipient computer system, to automatically convert the decoded file into a format which is different from the original format of the filed received by the systems of the instant invention. In one example, when NDBs (or blocks/segments) of the file arrive at a recipient's location, the instant invention provides an option to select that those segments be uncompressed to either: (1) the original format of the transmitted file, or (2) to be uncompressed and transcoded into a different format. In one example, if the recipient chooses to have the file transcoded into a different format (e.g. different video format), the arrived data will first be decoded into an intermediary 10-bit RAW format and then be transcoded into the desired format, such as .mov, .mpeg, .avi, etc.

In one example, the methods and systems of the instant invention use at least some principles of BP methodology which are directed to distributions of files (or segments, NDBs, other pieces of data) through communications means (e.g., the Internet) to multiple recipients by sharing segment(s) of the transmitting file that one recipient has already received and another recipient needs (i.e., avoiding necessity of sending directly each block/segment or NDB and leveraging each recipient's uploading bandwidth to increase the speed of transmission of the file to a plurality of recipients.)

In one example, the methods and systems of the instant invention can include at least three entities: 1) at least one sender unit that is sending information; 2) at least one recipient unit that is receiving information, and 3) at least one core server that functions as a centralized host/hub. For purposes of describing the present invention, the term "unit" includes a separate physical computer system and/or software residing in a electronic machine. In one example, all networking communications rely on the TCP protocol. In one example, all networking communications rely on the UDP protocol. In one example, the central server uses SQL Server Light as its database.

In one example, all participating the sender and recipient units constantly communicate with the core server to provide/update their addressing/connection information. In one example, to initiate a transfer, the methods and systems of the instant invention would gather a list of available recipient units from the core server, and then select the destination(s). In one example, after the instant invention has selected the destination(s), peer to peer connection(s) is established between participating entities. In one example, if it is a one-to-one transfer, a direct connection is established between two units. In one example, if it is a transfer with multiple recipients, the network topology is adjusted accordingly.

In one example, at least some the systems of present invention record the Up and Down bandwidths of each participating unit during first time that the particular unit is added to the inventive system, by measuring a particular bandwidth in real time. In one example, the recorded initial bandwidth numbers are only used as initial values (first guess). In one example, during file transfer, at least some of systems of the present invention continuously monitor the transfer conditions of (1) each individual unit and/or communication(s) among units. In one example, the present invention provides a functionality to, automatically and/or manually, adjust at least one characteristic of the transmission to ensure that the first priority is given to recipients having the fastest bandwidth.

In one example, all units agree on a universal job ID, and the job info is transmitted to all units. In one example, the Job info can include: Identities of Sender/Recipient, priority ranking based on original bandwidth (first guess).

In one example, each recipient finds its place in the chain base on its priority ranking, and requests the job from its sender starting at byte position zero.

In one example, each receiving unit receives this request to start sending a job waits until a first segment or NDB shows up, and then starts transmitting the arrived segment/NDB to another recipient.

In one example, each participating unit at this point is monitoring the in/out bandwidth.

In one example, a system of the instant invention determines if the priority ranking needs to be adjusted to maintain/maximize bandwidth efficiency when there is a change in at least one characteristic of transfer (e.g. a receiving unit that previously had high UP bandwidth became slower). In one example, prior to making the adjustment, the system of the instant invention waits until a sending unit completes the current block transfer and requests disconnect, and then sends a similar message to its receiving unit. In one example, (all) affected receiving unit(s) (recipients) then establish(s) new connection(s) and request(s) a job by sending for the job ID starting a determined byte position and transmission resumes.

In one example, if the sender unit fails to establish transmission to a particular receiving unit or if receiving units break off the communication link between them, the particular receiving unit can try for a certain time to reconnect to the sender and/or recipient unit and, if not successful, then puts itself at the bottom of the priority chain and requests segments from the recipient unit which is next to the last. In one example, requesting the next segment from the next to last unit on the priority chain, forces the next-to-last unit to obtain the segment(s) from a unit which is 2-up on the priority chain.

In one example, when a failed unit comes back online later, it can, substantially realtime (e.g., several milliseconds) re-request the file from its sender starting from the break-off byte (or NDB, or block/segment) position. In one example, the present invention uses at least one core server system (based on at least number of recipients, participants of the system, redundancy demand, etc.) to assist in the network transfer by providing high symmetrical bandwidth and the resume functionality for failed connections.

In some examples, even without any failed connection(s), the core server can function as a receiving unit with high symmetrical bandwidth, and can delete the file that it has received after the successful completion of the transfer to all receiving units. In one example, if a receiving unit disconnects in the middle of the transmission and then returns while a transfer is still active, the re-connected unit will reenter the priority chain at the lowest position. In one example, if the receiving unit does not return online until the transfer is completed for all other participants, that receiving unit can the query the core server to resume the transfer from the point of the last received byte (or segment, or NDB) and complete the transfer.

In one example, if a particular receiving unit has a dedicated network connection with a symmetrical bandwidth that is higher than a bandwidth of the core server, then the topology in accordance with one embodiment of the instant invention can be adjusted by the core server to allow, the particular receiving unit to be the highest in the priority chain.

In one example, the instant invention provide a functionality to continuously update the priority change and to observe the transmission progress. In one example, the transmission status/progress (e.g. a speed of transfer) only provides lowest bandwidth info between two units. In one example, when the priority chain's order is altered, the transmission "to/from" status is updated based on the new lowest bandwidth between two particular units to give a more accurate picture of what's happening. In one example, every time there is a change in the order of the priority ranking, the instant invention allows a more accurate analysis of both send and receive bandwidth.

In one example of the instant invention, a sender computer system and/or the core server assigns the each segment/bock (or NDBs) to a particular receiving unit.

In one example of the instant invention, the sender computer system and/or the core server confirms that each recipient receives all pieces to reconstruct the original file. In one example of the instant invention, the sender computer system and/or the core server confirms that each recipient receives all pieces to reconstruct the original file, by maintaining a duplicate copy of transmitting segments/NDBs at the core server.

In one example, the instant invention provides a secure transmission by communicating over SSL and by using 64 bit encryption. In one example, the instant invention provides a secure transmission by assigning a unique 64 bit unit ID and 64 bit user ID. In one example, in order to breach the security, an intruder would need to know the format of for both IDs.

In one example, the methods and systems of the instant invention allow to transmit files whose size ranges from about 1 Megabytes to about 2 Terabytes. In one example, the methods and systems of the instant invention allow to transmit files whose size ranges from about 100 Megabytes to about 2 Terabytes. In one example, the methods and systems of the instant invention allow to transmit files whose size ranges from about 50 Megabytes to about 2 Terabytes. In one example, the methods and systems of the instant invention allow to transmit files whose size ranges from about 200 Megabytes to about 2 Terabytes. In one example, the methods and systems of the instant invention allow to transmit files whose size ranges from about 500 Megabytes to about 2 Terabytes. In one example, the methods and systems of the instant invention allow to transmit files whose size ranges from about 1 Gigabytes to about 2 Terabytes. In one example, the methods and systems of the instant invention allow to transmit files whose size ranges from about 5 Gigabytes to about 2 Terabytes.

Illustrative Operating Environment and Applications of Examples of Methods and Systems of the Instant Invention FIG. 1 illustrates one embodiment of an environment in which the present invention can operate. However, not all of these components can be required to practice the invention, and variations in the arrangement and type of the components can be made without departing from the spirit or scope of the invention. In some embodiment, the invention system hosts a large number of members and concurrent transactions. In other embodiments, the invention system computer is based on a scalable computer and network architecture that incorporates varies strategies for assessing the data, caching, searching, and database connection pooling. An example of the scalable architecture is an architecture that is capable of operating multiple servers.

In embodiments, members of the inventive computer system 102-104 (e.g. sending and/or receiving units) include virtually any computing device capable of receiving and sending a message over a network, such as network 105, to and from another computing device, such as servers 106 and 107, each other, and the like. In embodiments, the set of such devices includes devices that typically connect using a wired communications medium such as personal computers, multiprocessor systems, microprocessor-based or programmable consumer electronics, network PCs, special-purpose electronic devices, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in embodiments, client devices 102-104 are any device that is capable of connecting using a wired or wireless communication medium such as a PDA, POCKET PC, wearable computer, and any other device that is equipped to communicate over a wired and/or wireless communication medium.

In embodiments, each member device within member devices 102-104 can include a browser application that is configured to receive and to send web pages, and the like. In embodiments, the browser application can be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like. In embodiments, the invention is programmed in either Java, C++, or .Net.

In embodiments, member devices 102-104 can be further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In embodiments, network 105 can be configured to couple one computing device to another computing device to enable them to communicate. In embodiments, network 105 can be enabled to employ any form of computer readable media for communicating information from one electronic device to another. Also, in embodiments, network 105 can include a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router can act as a link between LANs, enabling messages to be sent from one to another.

Also, in some embodiments, communication links within LANs typically include twisted wire pair or coaxial cable, while communication links between networks can utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link. In essence, in some embodiments, network 105 includes any communication method by which information can travel among and between devices 102-104 and servers 106 and 107.

Figure 2:
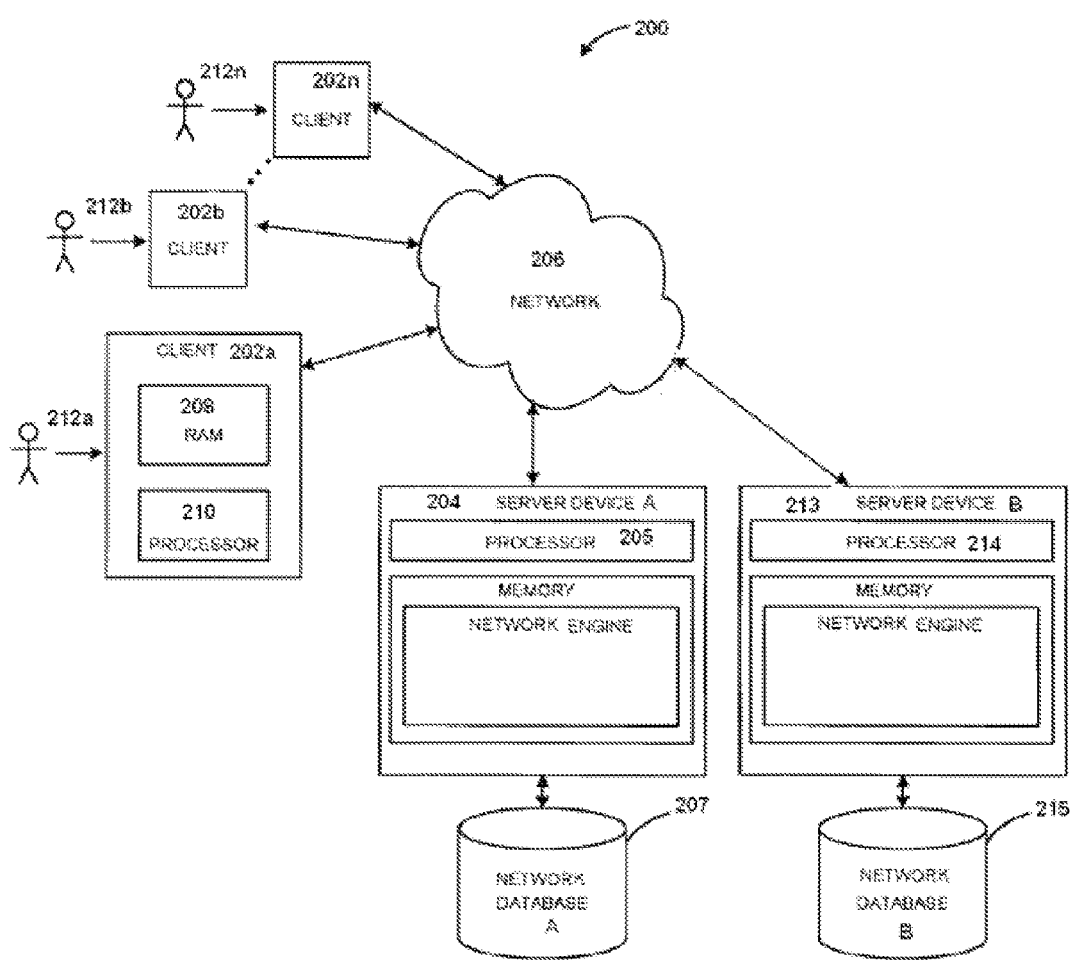
FIG. 2 shows another embodiment of the instant invention.

FIG. 2 shows another exemplary embodiment of the computer and network architecture that supports the invention system. The member devices 202*a*, 202*b* thru 202*n* shown (e.g. sending and receiving units) each comprises a computer-readable medium, such as a random access memory (RAM) 208 coupled to a processor 210 or FLASH memory. The processor 210 can execute computer-executable program instructions stored in memory 208. Such processors comprise a microprocessor, an ASIC, and state machines. Such processors comprise, or can be in communication with, media, for example computer-readable media, which stores instructions that, when executed by the processor, cause the processor to perform the steps described herein.

Embodiments of computer-readable media can include, but are not limited to, an electronic, optical, magnetic, or other storage or transmission device capable of providing a processor, such as the processor 210 of client 202*a*, with computer-readable instructions. Other examples of suitable media can include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media can transmit or carry instructions to a computer, including a router, private or public network, or other transmission device or channel, both wired and wireless. The instructions can comprise code from any computer-programming language, including, for example, C, C++, C#, Visual Basic, Java, Python, Perl, and JavaScript.

Member devices 202*a-n* can also comprise a number of external or internal devices such as a mouse, a CD-ROM, DVD, a keyboard, a display, or other input or output devices. Examples of client devices 202*a-n* can be personal computers, digital assistants, personal digital assistants, cellular phones, mobile phones, smart phones, pagers, digital tablets, laptop computers, Internet appliances, and other processor-based devices. In general, a client device 202*a* are be any type of processor-based platform that is connected to a network 206 and that interacts with one or more application programs. Client devices 202*a-n* can operate on any operating system capable of supporting a browser or browser-enabled application, such as Microsoft™, Windows™, or Linux. The client devices 202*a-n* shown can include, for example, personal computers executing a browser application program such as Microsoft Corporation's Internet Explorer™, Apple Computer, Inc.'s Safari™, Mozilla Firefox, and Opera. As shown in FIG. 2, server devices 204 and 213 can be also coupled to the network 206.

Of note, the embodiments described herein can, of course, be implemented using any appropriate computer system hardware and/or computer system software. In this regard, those of ordinary skill in the art are well versed in the type of computer hardware that can be used (e.g., a mainframe, a mini-computer, a personal computer ("PC"), a network (e.g., an intranet and/or the internet)), the type of computer programming techniques that can be used (e.g., object oriented programming), and the type of computer programming languages that can be used (e.g., C++, Basic, AJAX, Javascript). The aforementioned examples are, of course, illustrative and not restrictive.

In one example, the "Warp Send" compression methods and systems of the present invention can employ parallel processing functionalities (e.g., multithread processing based on clock frequency (e.g., 250 MHz to 4 GHz), memory access rate (e.g., 10 GB/s to over 300 GB/s of bandwidth), programmable shaders, a number of pipelines, etc.) of one or more GPU (Graphics Processing Units) for the Warp compression/decompression processing. In one example, with respect to at least video data, the "Warp Send" compression methods and systems of the present invention can employ APIs for GPU-processing, such as DxVA, VDPAU, VAAPI, XvMC, and XvBA. In one example, the "Warp Send" compression methods and systems of the present invention can employ integrated graphics solutions, shared graphics solutions, or IGP (Integrated Graphics Processors") that can utilize at least a portion of a computer's system RAM or have dedicated memory. In one example, the "Warp Send" compression methods and systems of the present invention can employ an API extension to the C programming language CUDA ("Compute Unified Device Architecture") which allows specified functions from a normal C program to run on the GPU.

In one example, the "Warp Send" compression methods and systems of the present invention can employ parallel processing functionalities of one or more CPUs (Central Processing Unit) for the Warp compression/decompression processing. In one example, the "Warp Send" compression methods and systems of the present invention can employ a combination of parallel processing functionalities of one or more GPUs and one or more CPUs for the Warp compression/decompression processing.

Figure 3:
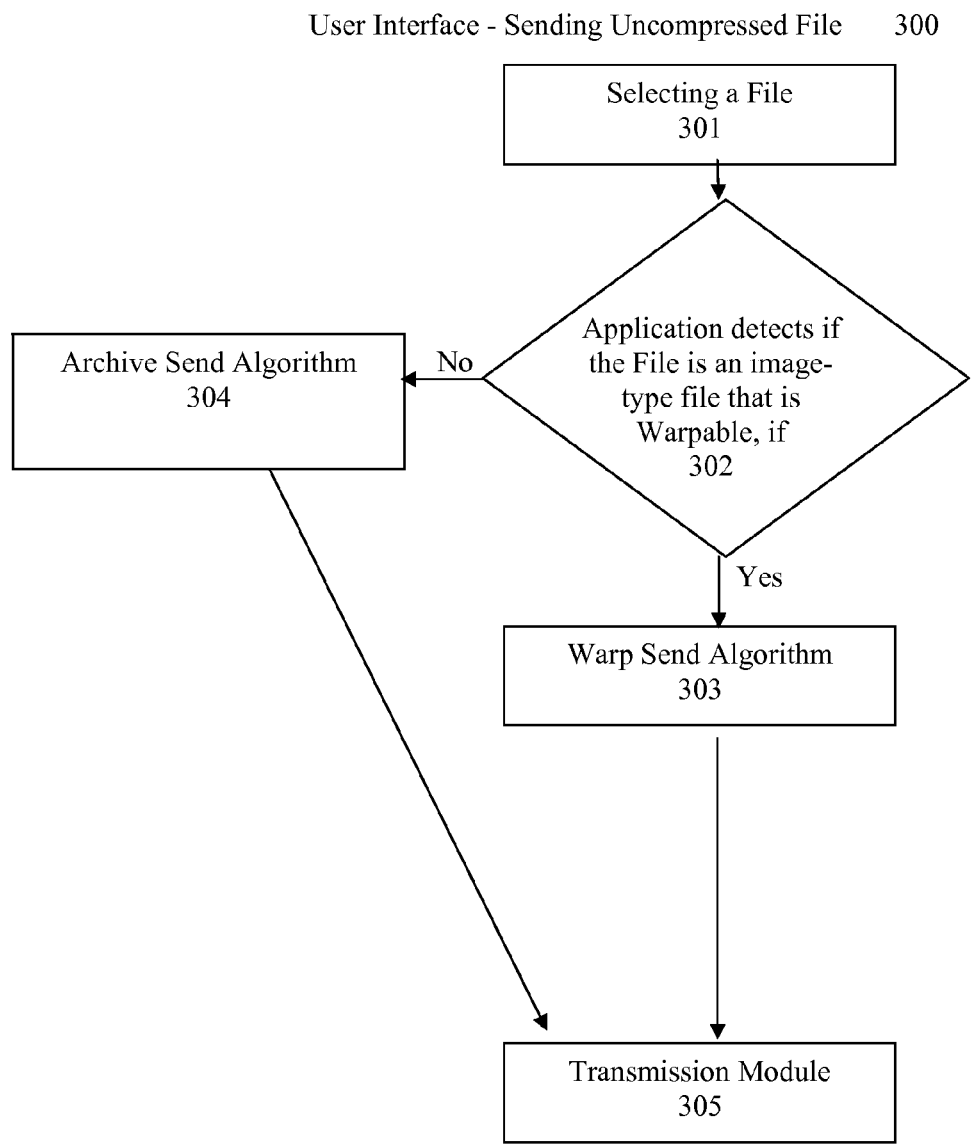
FIG. 3 shows a flow chart of another embodiment of the instant invention.

Referring to FIG. 3. FIG. 3 shows a flow chart of an exemplary embodiment of an aspect of a particular sending computer unit that is employed to send an initial uncompress file in accordance with at least some principles of the instant invention. In one example, in step 301, the sending computer unit receives a file that needs to be transmitted. In one example, the file could have been previously loaded into memory of the sending computer unit or being obtained from a removable storage container (e.g. CD, DVD, etc). In step 2, the sending computer unit checks if the file is an image-type file that can be efficiently sent by using Warp Send methods of the instant invention (i.e., "Warpable" file). If the sending computer unit cognizes that can be sent by using a Warp Send, then in step 303, it compresses by the file using the "Warp send" methodology and sends the compressed blocks/segments to a transmission module (305).

If, in step 302, the sending computer unit detects that the file is not "Warpable" file, in step 304, the sending unit compresses the file using by the "Archive Send" algorithm by breaking the file into blocks/segments, as disclosed above for the "Archive Send" methods (e.g., LZMA, Crush, Lz/lb, Lagarith, etc.) to compress segments for their transmission. The sending computer unit then forwards the compressed blocks/segments, and then forwards the compressed to the transmission module (305). In one example, the "Archive Send" compression can be based on the Lagarith algorithm. In one example, the "Archive Send" compression can be based on one or more lossless compressions algorithms that are described above.

Figure 4:
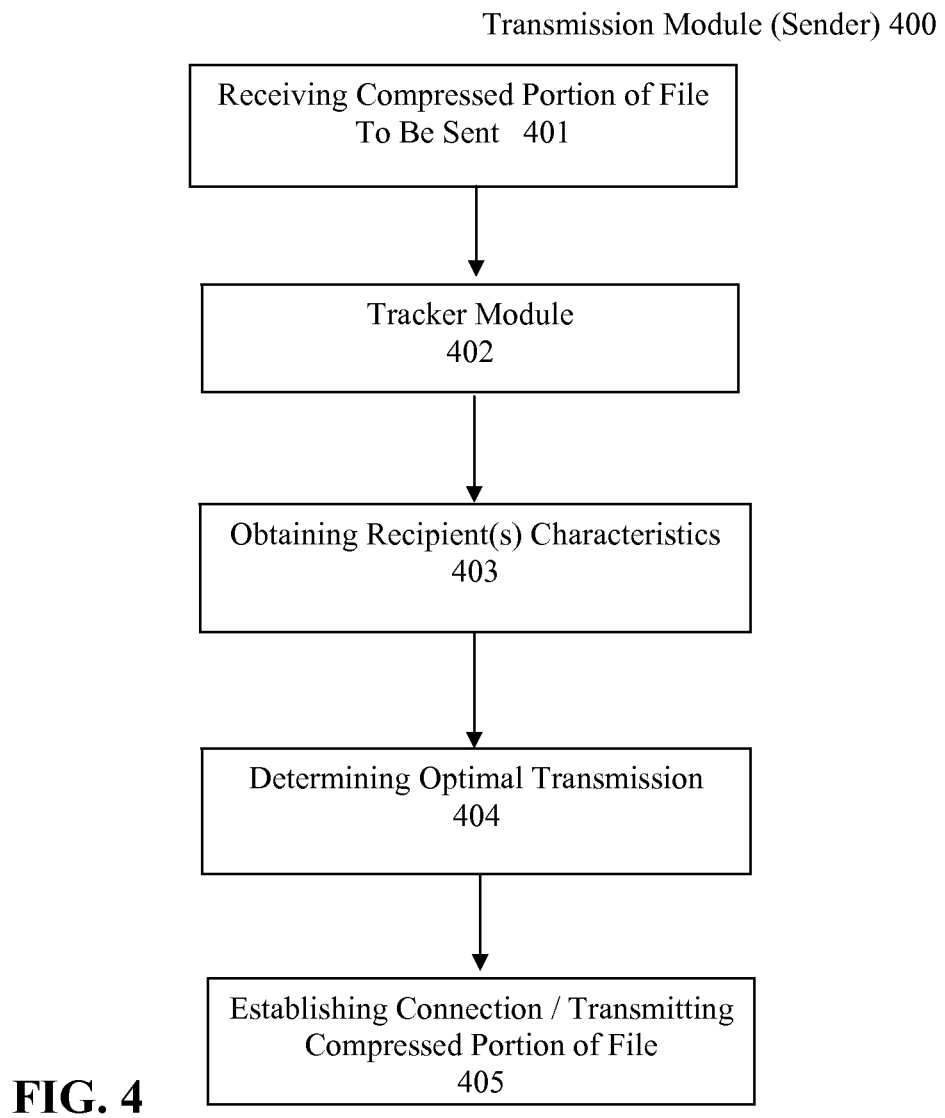
FIG. 4 shows a flow chart of yet another embodiment of the instant invention.

Referring to FIG. 4. FIG. 4 shows a flow chart of an exemplary embodiment of a transmission module 400 of a particular sending computer unit that is used to transmit the compressed segments in accordance with at least some principles of the instant invention. As the compressed blocks/segments are received by the transmission module, step 401, the transmission module 400 activates a tracker module in step 402. The tracker module determines based at least in part on upload/download speeds of recipient computer units, in steps 403, if a core server should be added to increase speed, and confirm a priority chain among all units to be participating in the transmission, in step 404. After the priority chain is determined and confirmed, the transmission module 400 establishes connection and begins the transfer, in step 405.

Figure 5:
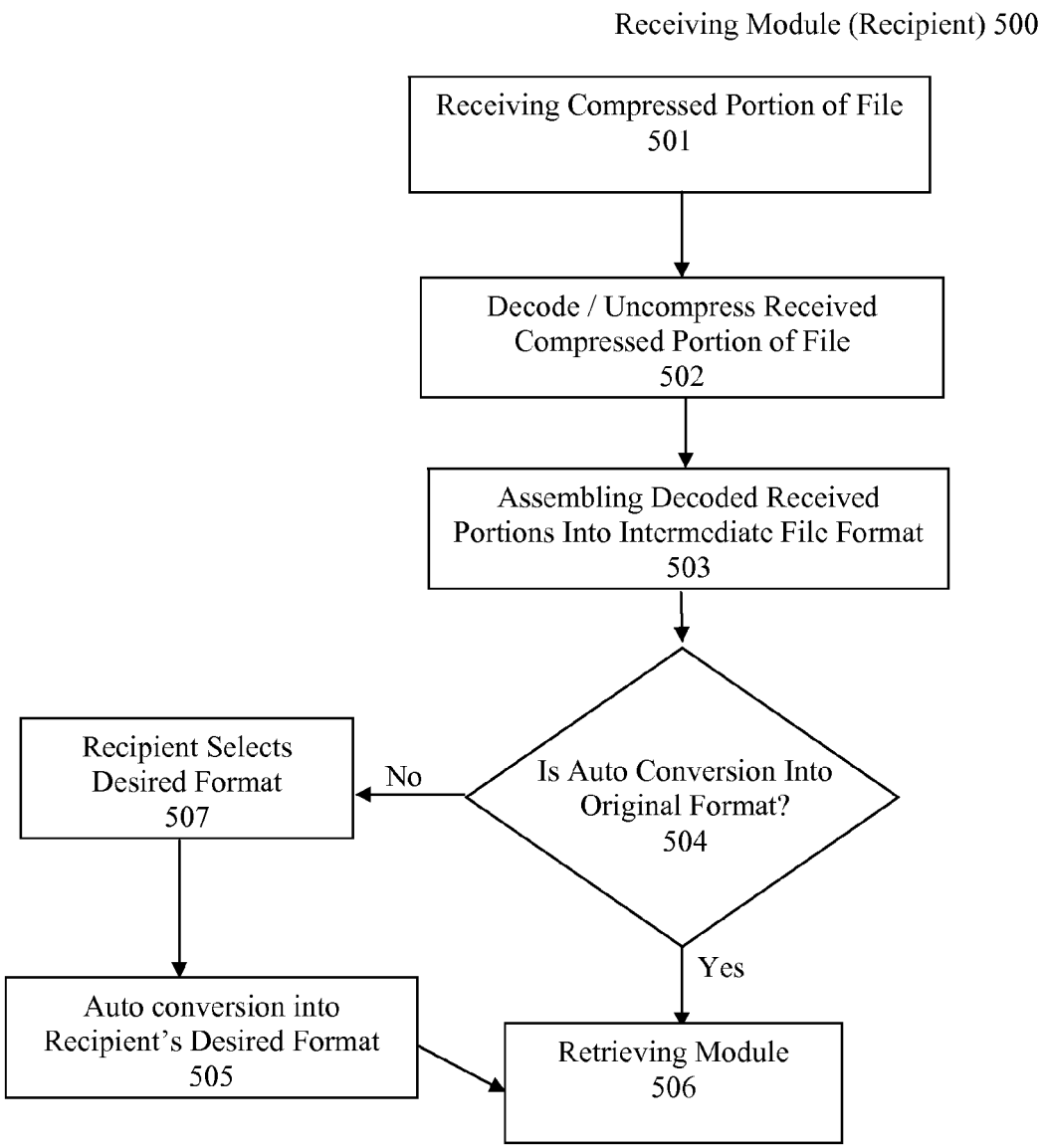
FIG. 5 shows a flow chart of yet another embodiment of the instant invention.

Referring to FIG. 5. FIG. 5 shows a flow chart of an exemplary embodiment of a receiving module 500 of a particular receiving unit operated in accordance with at least some principles of the instant invention. In one embodiment, if the receiving machine does not turn on auto conversion, the file is converted to the original format.

Figure 6:
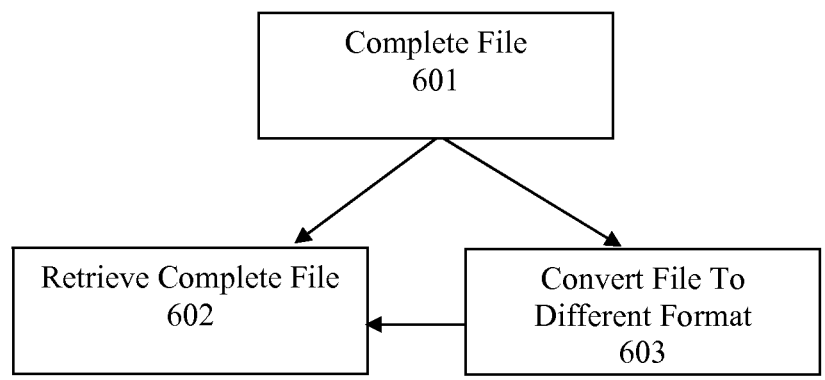
FIG. 6 shows a flow chart of another embodiment of the instant invention.

Referring to FIG. 6. FIG. 6 shows a flow chart of an exemplary embodiment of a retrieving module 600 of a particular receiving unit operated in accordance with at least some principles of the instant invention. In one example, using the retrieving module 600, a recipient computer unit can download the received and reconstructed file, in step 601, onto any removable storage medium, in step 602. In some embodiment, the reconstructed file can be copied over an internal network (ex. LAN) to other network accessible drives (e.g., from the receiving unit to a SAN, NAS, or other suitable network accessible storage). In one example, using the retrieving module 600, a recipient computer unit can first convert the received and reconstructed file into a desired format in step 603 prior to downloading it, in step 602.

In one example, the sending computer unit and the receiving computer unit are two different physical devices (e.g. different computers.) In one example, the sending computer unit and the receiving computer unit represent a software having these separate functionalities but residing within a single physical device (e.g. a single computer) or within a plurality of interconnected physical devices (e.g. a network of computers.) Consequently, as disclosed therein, the term "sending computer unit' refers to the function of sending a file/data, and the term receiving (or recipient) computer unit refers to the function of receiving the file/data sent by the sending computer unit. Thus, one skilled in the art would ready appreciate that these functions can be performed by a single computer device.

Examples of Some Aspects of WARP Send Methods and Systems of the Instant Invention For Processing Image Data (e.g., Video Files, Static Image Files, Etc.).

The following examples of some aspects of the instant invention are described based on video data files whose file size range from about 1-2 GB (Gigabyte) to 700-800 GB. However, it is understood that the instant invention is not limited to processing video files to such particular sizes. In addition, regarding static image files, the following examples of some aspects of the instant invention is premised on the notion that the static images are initially aggregated in a package based on, for example, time sequence in which they were taken. For example, images are stored in the same storage location, which the instant invention would process as a virtual container of these images similar to AVI-like wrapper discussed below regarding video files.

Example 1

Some Aspects of Pre-Encoding (Pre-Compression) Processing

In one embodiment, before Warp compression algorithms are applied during the Warp Send methods, video files may need to be subjected to pre-encoding processing depending on the type of particular video file. In one embodiment, no pre-encoding processing is required if a video file is AVI wrapped (i.e., packaged into AVI or AVI-like file multimedia file container) and is in one of the following formats: YUV422, RAW/uncompressed, or RGB format. In one embodiment, AVI-packaged video data is divided into segments, or "chunks." In one embodiment, each "chunk" is identified by a FourCC tag. In one embodiment, an AVI file takes the form of a single chunk in a RIFF formatted file, which can be then subdivided into two mandatory "chunks" and one optional "chunk". In one embodiment, the first sub-chunk is identified by the "hdrl" tag. In one embodiment, the "hdrl" chunk is the file header and contains metadata about the video, such as its width, height and frame rate. In one embodiment, the second sub-chunk is identified by the "movi" tag. In one embodiment, the "movi" chunk contains the actual audio/visual data. In one embodiment, the third optional sub-chunk can be identified by the "idx1" tag which indexes the offsets of the data chunks within the AVI-wrapped file. In one embodiment, the audio-visual data contained in the "movi" chunk can be encoded or decoded by software called a codec, which is an abbreviation for (en)coder/decoder. In one embodiment, upon creation of the file, the codec translates between raw data and the (compressed) data format used inside the chunk. In one embodiment, the "movi" chunk data is further segmented into segments of 5 frames. In one embodiment, the "movi" chunk data is further segmented into equal segments of between 5 and 1000 frames. In one embodiment, instead of AVI-like wrapper, the instant invention can use another suitable wrapper (multimedia container) that has streamable feature (i.e., ability to constantly received by and presented to an end-user while being delivered by a streaming provider).

In one embodiment, pre-encoding processing is required if a video file is not in the form described above. In one embodiment, the pre-encoding processing can include a conversion into AVI-like wrapper format (i.e., an intermediary transport format) and color space conversion to YUV422 for all frames on the frame-by-frame basis.

In one embodiment, initial processing is perform in chunks/segments of 5 frames per segment/chunk. In one embodiment, initial processing is perform in chunks/segments of 50 frames per segment/chunk. In one embodiment, initial processing is perform in chunks/segments of 100 frames per segment/chunk. In one embodiment, initial processing is perform in chunks/segments of 250 frames per segment/chunk. In one embodiment, initial processing is perform in chunks/segments of 1000 frames per segment/chunk. In one embodiment, initial processing is perform in chunks/segments between 5 and 1000 frames per segment/chunk.

In one embodiment, the initial pre-compression processing of color space conversion is about 0.00031 seconds per frame or less. In one embodiment, initial pre-compression processing of color space conversion is 001 seconds per frame or less. In one embodiment, initial pre-compression processing of color space conversion is 0.01 seconds per frame or less. In one embodiment, initial pre-compression processing of color space conversion is 0.0005 seconds per frame or less.

Example 2

Some Aspects of Warp Compression Algorithms

In one embodiment, the Warp compression works by encoding sets of 5 frames (i.e., dividing original or intermediately/pre-processed file into sets of 5 frames). In one embodiment, a frame 3 in the set of 5 frames is designated to be a key frame—i.e., the entire actual content of remaining frames 1, 2, 4, and 5 will be compared against the actual content of frame 3 and the key frame will be encoded in a form of original frame. In one embodiment, frames 1, 2, 4, and 5 are designated to be difference frames. In one embodiment, the difference frames are computed against the key frame 3. In one embodiment, the standard deviation of all pixel differences in luminance channel is computed to determine whether frames 1, 2, 4, and 5 should be encoded as difference frames or in the original form. In one embodiment, if the standard deviation is less than 5 (a pre-determined value), a difference frame is utilized. In one embodiment, if the standard deviation is greater than 5, the original image is utilized.

In one embodiment, after the above difference/original frame analysis is performed, the set of resulting 5 frames (5 frames in original format, or 4 difference frames and 1 original (i.e., the key frame) is subject to multiscale wavelet compression that is applied to each frame on the frame-by-frame basis. In one embodiment, the multiscale wavelet compression utilizes a Cohen-Daubechies-Feauveau (CDF) 9/7 floating point transform in 5 levels of resolution as lossy compression.

In one embodiment, the processing time for group of 5 frame that includes segmentation into set of 5 frames, color space conversion, the key frame/difference frame conversion, and wavelet conversion is about 0.00140 seconds per frame or less. In one embodiment, the processing time for group of 5 frame that includes segmentation into set of 5 frames, color space conversion, the key frame/difference frame conversion, and wavelet conversion is about 0.00250 seconds per frame or less. In one embodiment, the processing time for group of 5 frame that includes segmentation into set of 5 frames, color space conversion, the key framde/defference frame conversion, and wavelet conversion is about 0.005 seconds per frame or less. In one embodiment, the processing time for group of 5 frame that includes segmentation into set of 5 frames, color space conversion, the key framde/defference frame conversion, and wavelet conversion is about 0.0001 seconds per frame or less.

In one embodiment, after the multiscale wavelet compression, the set of 5 frames is further subject to a Human Visual Systems (HVS) filter. In one embodiment, the HVS filter employs a gamma function to stretch out the tones in highlights so they receive more bits than shadows (e.g., converting Y to Y' for YUV422 format). Gamma correction, gamma nonlinearity, gamma encoding, or often simply gamma, is a nonlinear operation used to code and decode luminance or tristimulus values in video or still image systems. In one embodiment, gamma correction is, in the simplest cases, defined by the following power-law expression:

$$V_{out} = AV_{in}^{\gamma}$$

where A is a constant and the input and output values are non-negative real values; in the common case of A=1, inputs and outputs are typically in the range 0-1. A gamma value $\gamma<1$ is sometimes called an encoding gamma, and the process of encoding with this compressive power-law nonlinearity is called gamma compression; conversely a gamma value $\gamma>1$ is called a decoding gamma and the application of the expansive power-law nonlinearity is called gamma expansion.

In one embodiment, the HVS filter uses a gamma function to stretch out the tones in the highlights so they receive more bits than the shadows because the human eye is sensitive to banding and contouring in light tones.

In one embodiment, the HVS filter processing time for group of 5 frame is about 0.0397 seconds per frame or less. In one embodiment, the HVS filter processing time for group of 5 frame is about 0.05 seconds per frame or less. In one embodiment, the HVS filter processing time for group of 5 frame is about 0.03 seconds per frame or less. In one embodiment, the HVS filter processing time for group of 5 frame is about 0.02 seconds per frame or less.

In one embodiment, after the multiscale wavelet compression, the set of 5 frames is further subject to signal to noise ratio is selected for each frame. In one embodiment, the key frame or original image is subject to signal to noise ratio of 50 db which is visually lossless compression that is able to capture the film grain. In one embodiment, the difference frames are subject to signal to noise ratio of 30 db which is visually lossy, allowing to convey just enough difference at the film grain scale to differentiate the image from the key frame so that the film grain does not remain static.

In one embodiment, for 30 db snr processing of a difference frame, the film grain from the key frame provides most of the detail and the difference frame simply differentiates the frame in very few bits. The result is a reconstructed difference frame with excellent apparent film grain that is different from the key frame. In one embodiment, the film grain is a visually lossless (not lossless) version of the actual film grain for that difference frame, but is based on similar statistical modeling to appears plausible and visually lossless (e.g., using statistical score to place film grain during decoding stage in the same or substantially the same area where the film grain was present in the original frame). In one embodiment, because of the similar statistical score between the actual film grain and the reconstructed film grain, the larger features can be typically visually lossless upon reconstruction. In one embodiment, the above approach of employing similar statistical score of the actual (original) film grain can allow the instant invention to preserve quality for especially hard to compress elements such as random noise. In one embodiment, the signal-to-noise ratio (snr) measurement can be further modulated by tone, artificially lowering the measure in the highlights so it gets more bits. Visual lossless quality (statistically random element preservation)

Figure 8:
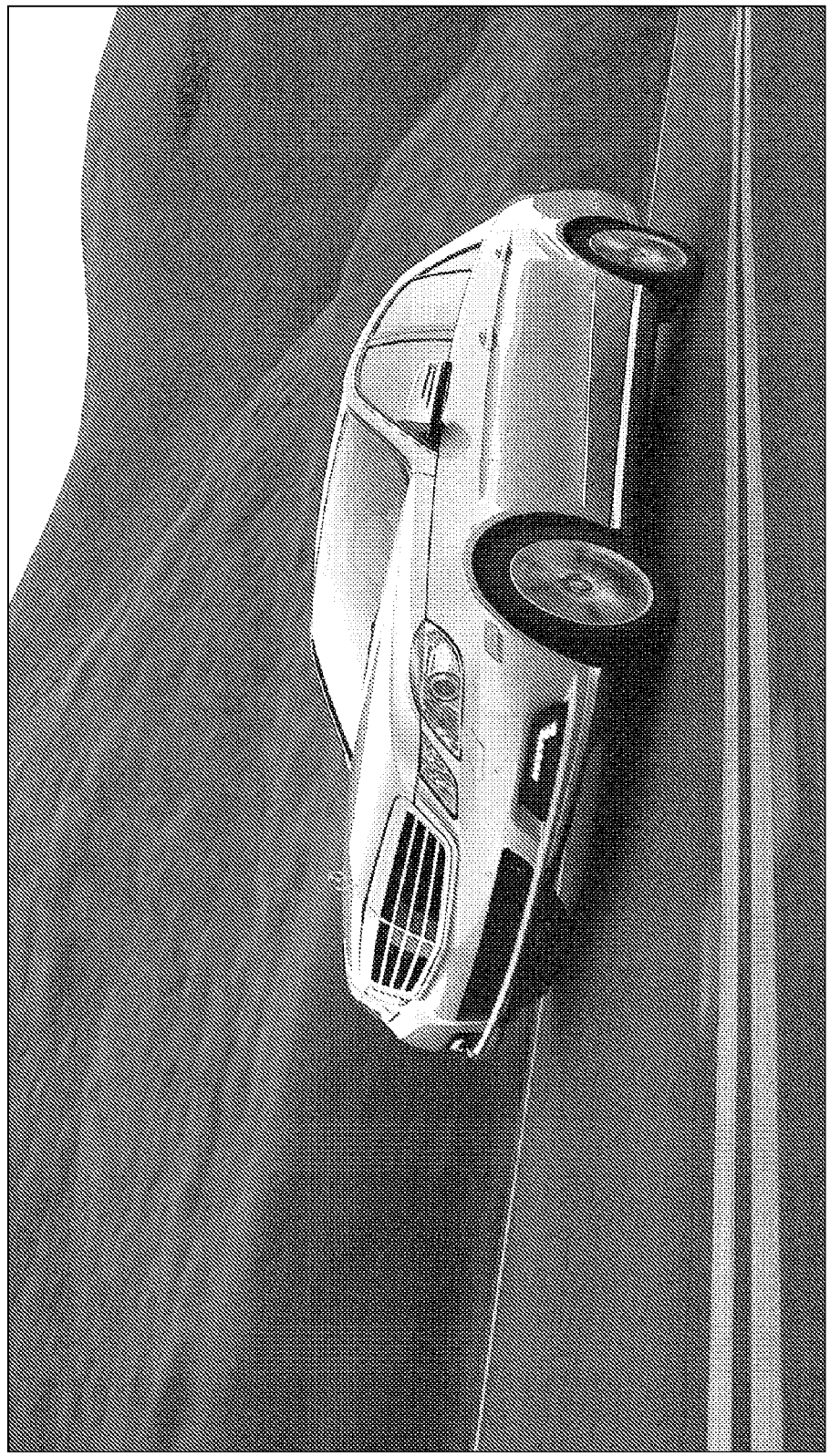
FIG. 8 shows an image.
Figure 9:
FIGS. 9-10 show outputs of an analysis performed on images that resulted from encoding of the image of FIG. 8 by compression protocols of MPEG2 (FIG. 9) and H.264 (FIG. 10).
Figure 10:
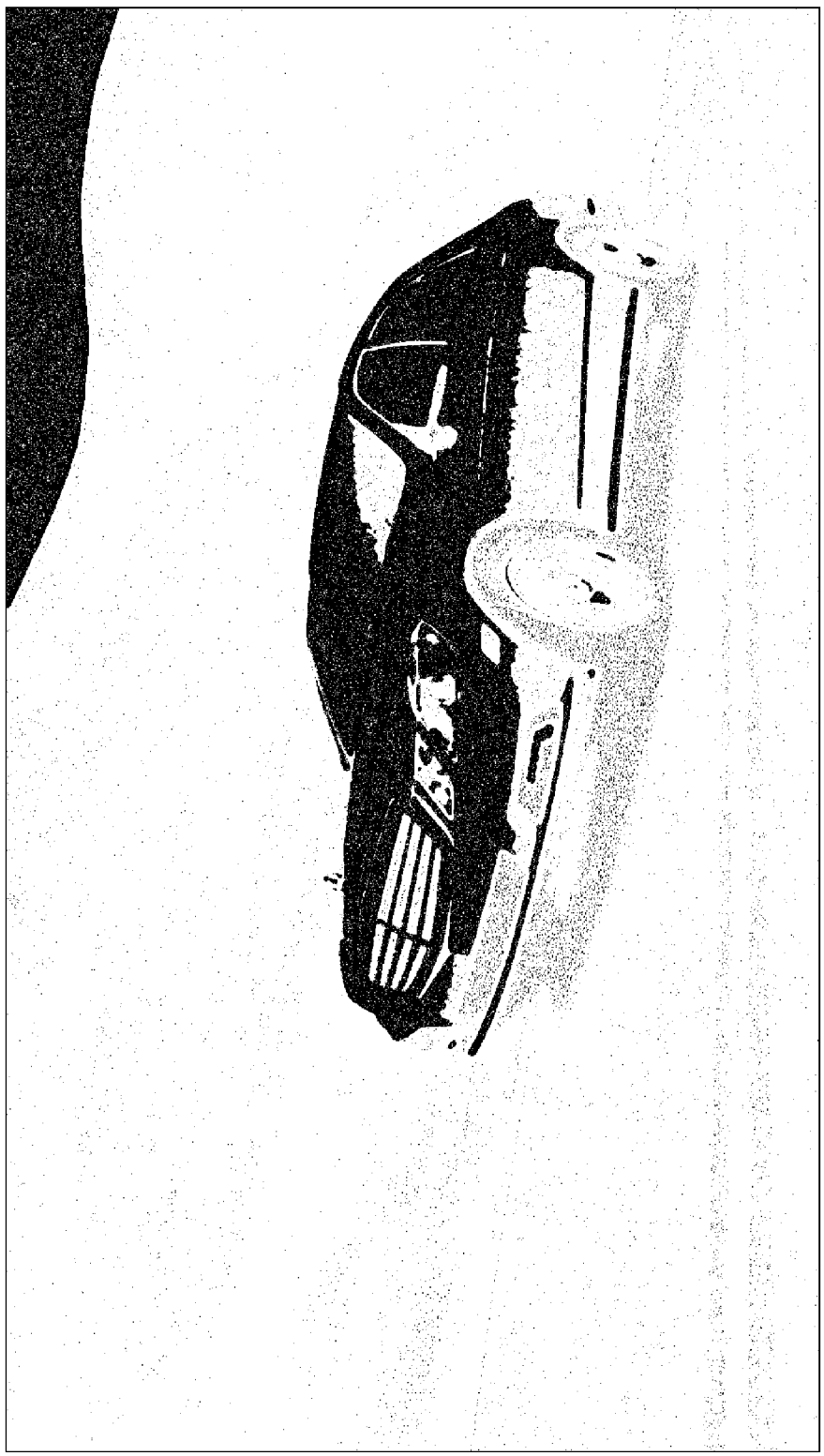
Figure 11:
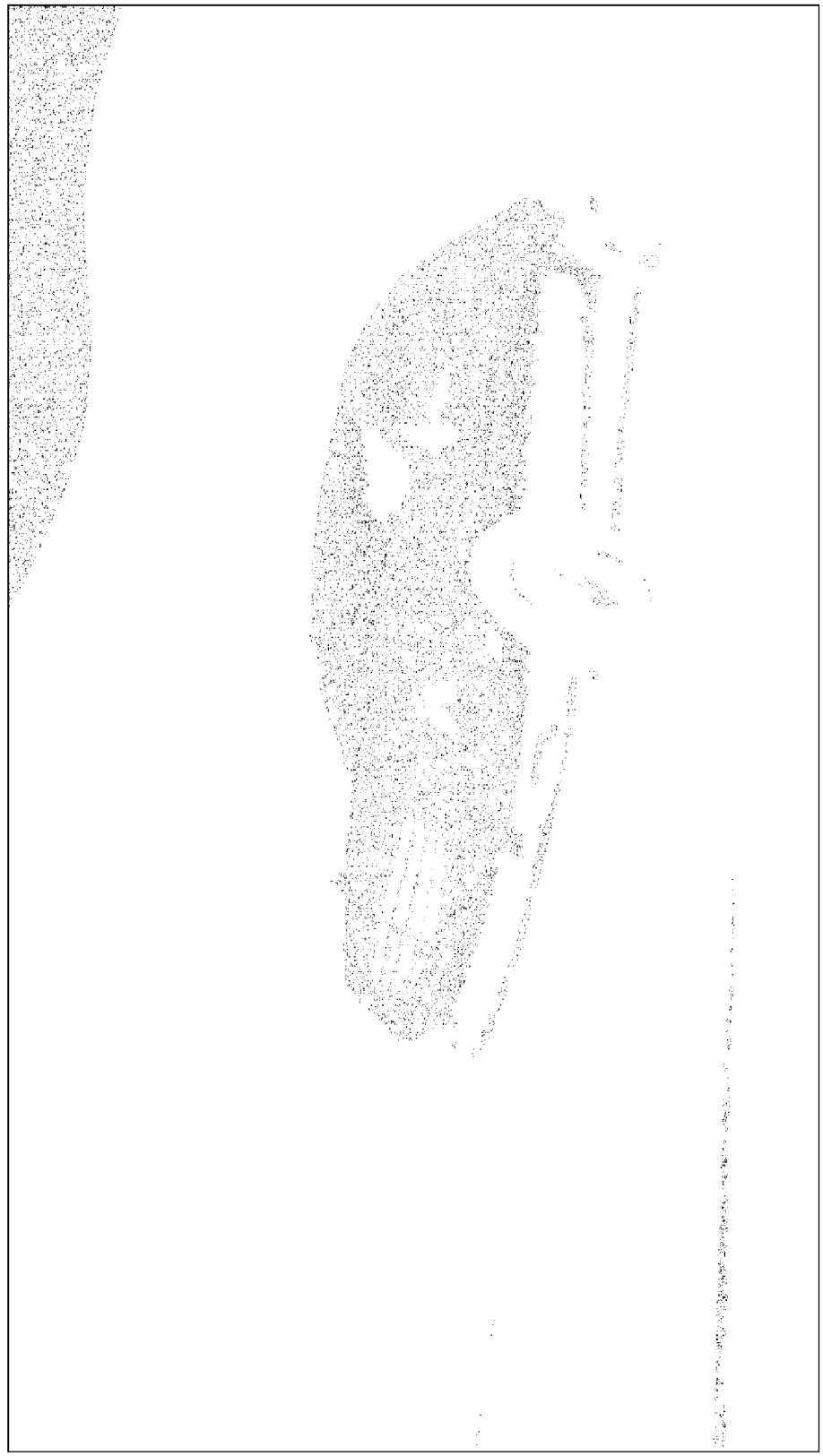
FIG. 11 shows an output of an analysis performed on an image that resulted from encoding of the image of FIG. 8 in accordance with some embodiments of the instant invention.

For example, FIGS. 8-11 illustrate the contrast between the film grain processing employed by the instant invention and other compressions. FIG. 8 shows an original image that has heavy film grain. FIGS. 9-11 show differences between the original image of FIG. 8 and images of FIG. 8 that resulted from the original image of FIG. 8 being encoded by using compression protocols of MPEG2 (FIG. 9), H.264 (FIG. 10), and some embodiments of the instant invention (FIG. 11). The difference between the original image FIG. 9 and images of FIG. 9 that were encoded by corresponding protocol was estimated by using a perceptual image diff tool provided at http://pdiff.sourceforge.net. The perceptual image diff tool compares between two images and outputs the pixel differences as blue and no change as black (for purposes of reproduction, the perceptual image diff tool images were converted into gray scale, rendering blue into black and black into white colors). This analysis shows that some embodiments of the instant invention were able to achieve smaller pixel-by-pixel difference in the film grain reconstruction to the original image than other types of image compression methods, schemes, algorithms, or codecs.

In one embodiment, the total encode processing time (examples 1 and 2) for group of 5 frame is about 0.04141 seconds per frame or less. In one embodiment, the total encode processing time (examples 1 and 2) for group of 5 frame is about 0.075 seconds per frame or less. In one embodiment, the total encode processing time (examples 1 and 2) for group of 5 frame is about 0.1 seconds per frame or less. In one embodiment, the total encode processing time (examples 1 and 2) for group of 5 frame is about 0.035 seconds per frame or less. In one embodiment, the total encode processing time (examples 1 and 2) for group of 5 frame is about 0.025 seconds per frame or less. In one embodiment, the total encode processing time (examples 1 and 2) for group of 5 frame is about 0.02 seconds per frame or less. In one embodiment, the total encode processing time (examples 1 and 2) for group of 5 frame is about 0.04 seconds per frame or less.

In one embodiment, the initial pre-compression and compression processing of the file occurs in parallel (in concurrent manner or substantially simultaneously—at least a portion of one process occurs at the same time as another processes is performed) with the transmission processing describe below in example 3.

In one example of applying the instant invention to MRI images (MRI datasets contain image slices that are highly spatially correlated and so benefit greatly from difference encoding), in one embodiment, the instant invention can select a particular, pre-determine, difference decision threshold and the snr for both difference and original images such that fine structure at the limits of the imaging system are conveyed in a visually lossless manner. In one embodiment, since medical imaging has typically no use for aesthetic reproduction of any image data so the snr of difference images can be raised to 50 db to match the original images. In such case, the delta compression standard deviation decision would be adjusted to preserve detail at the limit of the imaging system while still exploiting the high levels of spatial correlation seen in MRI images.

Example 3

Some Aspects of Transmission Processing

In one embodiment, after the Warp compression is performed for the set of 5 frames as described in Example 2, the instant invention transmit the encoded frames (i.e., frames process as described in Examples 1 and 2) by applying, for example, the following buffer encode protocol. In one embodiment, the sets of 5 encoded frames can be grouped for transmission based at least in part on the size of each frame (width×height). In one embodiment, the minimum grouping is 5 frames for frames with ultra-high resolutions of 2048×1156 and 4096×2312. In one embodiment, anther groupings can include 20 frames for frames having resolution of 1080p. In one embodiment, anther groupings can include 50 frames for frames having resolution of 720p. In one embodiment, group size can depends on variables in transfer speed between sender and receiver, transmission protocol (e.g., TCP, UDP), network bandwidth (e.g., available network transmission pipe size), and/or network latency (e.g., communication delay between network packets, can increases with geographical distance).

In one embodiment, the encoded (compressed) segments (e.g., set of 5 frames) are placed in a set of buffers. In one embodiment, the size of each buffer can be 10 MB or other size. In one embodiment, the size of each buffer depends on the optimum synchronization of processing power utilization between the encoding and decoding processes of the sending and receiving units respectively. In one embodiment, the optimum synchronization of processing power utilization between the encoding and decoding processes must be above 98%. In one embodiment, the optimum synchronization of processing power utilization between the encoding and decoding processes must be above 99%. In one embodiment, the optimum synchronization of processing power utilization between the encoding and decoding processes must be above 95%. In one embodiment, the optimum synchronization of processing power utilization between the encoding and decoding processes must be above 90%. In one embodiment, the optimum synchronization of processing power utilization between the encoding and decoding processes must be substantially 100%.

In one embodiment, if the original file size is 10 MB (Megabyte) or above, the transmission will not occur until 10 MB buffer is filled. In one embodiment, if the original file size is 10 MB (Megabyte) or above, the subsequent transmission will not occur until full 10 MB buffer is replenished with the new encoded data. In one embodiment, if the original file size is 10 MB (Megabyte) or above, after the transmission begins upon the first buffer reaching full 10 MB, the instant invention will continue to transmit without waiting for the full replenishment of the 10 MB buffer.

In one embodiment, if the file size is below 10 MB, all of the encoded data fits into one buffer and the buffer encoding/creation stops.

In one embodiment, after the buffer encoding, the filled buffer is read and transmitted. In one embodiment, Maximum Transmission Unit value (MTU), which is the size of NDB, is capped to 1500 bytes. In one embodiment, MTU value can range from 1500 bytes to 1000 Kb (Kilobytes). In one embodiment, MTU value can range from 10,000 bytes to 2000 Kb (Kilobytes). In one embodiment, MTU value can range from 1000 bytes to 500 Kb (Kilobytes). In one embodiment, MTU value can range from 1500 bytes to 500 Kb (Kilobytes).

In one embodiment, the transmitting module of the sending machine waits for a transmit request from a recipient machine. In one embodiment, the transmitting module of the sending machine does not wait for a transmit request from a recipient machine and transmit as soon as the buffer encoding conditions are fulfilled. In one embodiment, the 10 MB requests can be processed 1 MB at a time. (e.g., 10 calls for 10 MB) In one embodiment, the 10 MB requests can be processed 0.5 MB at a time. (e.g., 20 calls for 10 MB) In one embodiment, the size of the call depends on the same variable as used to breakdown encoded data into groups during the buffer encoding.

In one embodiment, the receiving machine continues to request 10 MB until the entire file has been transferred. In one embodiment, the sending machine continues to send from 10 MB buffers until the entire file has been transferred.

In one embodiment, the empty buffers returns for further processing.

In one embodiment, the receiving machine continues to request 10 MB buffers until the end point is read. In one embodiment, after the end point is read, the transfer is complete. In one embodiment, the end point is read from the header information Initiation (Example 11 below).

Example 4

Some Aspects of Decompression Processing

In one embodiment, the decoding is an inverse order of the encoding processing of the Warp compression described above in the example 2. In one embodiment, as at least one buffer of the recipient machine fills in with the arriving encoded NDBs which have been processed and transmitted as described in examples 1-3 above.

Example 5

Some Aspects of Synchronizing Compression, Transmission, And Decompression Processing In one embodiment, sending machine selects one or more videos or series of images and one or more destinations and initiates the processing in accordance with the instant invention. In one embodiment, when a send request is initiated, the processing of the file (Examples 1 & 2) occurs in parallel (in concurrent manner or substantially simultaneously—at least a portion of one process occurs at the same time as another processes is performed) with the transmission (example 3). In one embodiment, because difference images are only used for a single time step (e.g., frame-by-frame processing), no error accumulation is seen between the encoder and decoder that would require additional bits to correct, resulting in savings of bits for quality processing instead of being used up for the synchronization of encoding and decoding processing.

In one embodiment, similar to the buffer encoding on the sending machine, for optimum processing power, the decoding processing will not start until the buffer of receiving unit receives 10 Megabytes of buffer data for files whose file size is 10 MB or above. In one embodiment, when the buffer is finished and there is no end point on the buffer, the receiving machine makes an additional request to the sender for another buffer. In one embodiment, when the end point is read no additional requests for buffers from the sender are made. In one embodiment, the end point is read from the header information Initiation (Example 11 below).

In one embodiment, if the size of the original file is less than the decoding buffer size, the recipient machine creates only one decoding buffer. In one embodiment, the received encoded data is decoded until the end of the buffer.

Example 6

Some Aspects of Synchronization of Multi-Recipient Compression, Decompression and Transmission Processing In one embodiment, Machine A can send the data of encoded frames (NDBs) to Machine B and Machine C. In one embodiment, stages 1-2 (examples 1&2) occur on Machine A generates first transmission chunk (set of NDBs) made from sets of 5 encoded frames. In one embodiment, as described in the example 3, Machine A transmits the encoded NDBs to Machine B. In one embodiment, Machine B receives first encoded transmission (set of NDBs) (e.g., a chunk of 1 MB) and begins decoding of first group. In one embodiment, at the same time, Machine B begins transmission of the first encoded group (received from Machine A and without performing additional recompression by Machine B) to Machine C. In one embodiment, Machine C receives first encoded transmission and begins decoding of the first group. In one embodiment, stages 1-2 (examples 1&2) occur on Machine A to generate the second transmission chunk. In one embodiment, as described in the example 3, Machine A transmits the encoded NDBs of the second chunk to Machine B. In one embodiment, Machine B receives second encoded transmission and begins decoding of the second group as described in example 4. In one embodiment, at the same time, Machine B begins transmission of second encoded group (received from Machine A) to Machine C. In one embodiment, Machine C receives second encoded transmission and begins decoding of the second group.

Example 7

Some Aspects of Post-Decompression Processing

Figure 7:
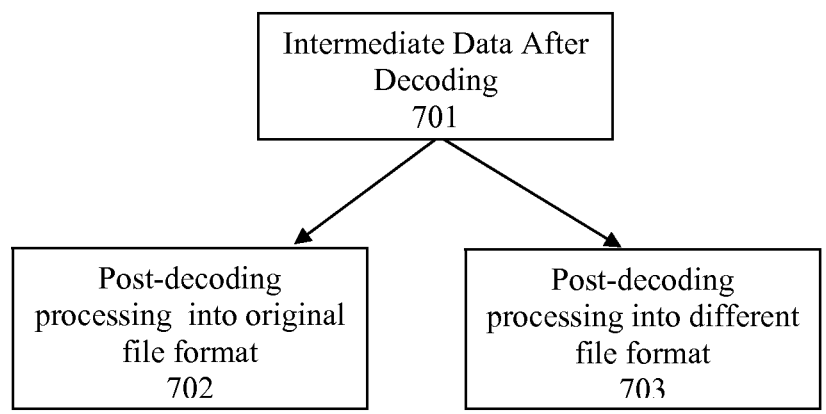
FIG. 7 shows a flow chart of another embodiment of the instant invention.

Referring to FIG. 7. In one embodiment, if no change was requested on the receiving machine, the receiving machine performs the decoding (701)—the inverse order of the image Warp compression (see example 2) into an intermediary RAW format, —and then performs the post-conversion processing (transcoding) in the inverse order of the pre-conversion processing of example 1 (702 step). In one embodiment, if a different format is desired, the receiving machine performs the decoding (701), —the inverse order of the image Warp compression (see example 2) into an intermediary RAW format, —and then performs the post-conversion processing (transcoding) in the inverse order of the pre-conversion processing of example 1 into the desired file format (703 step).

In one embodiment, the total decode and post-decoding (transcribing into ordinal file format or different) processing time (examples 3 and 7) is about 0.04984 seconds per frame or less. In one embodiment, the total decode and post-decoding (transcribing into ordinal file format or different) processing time (examples 3 and 7) is about 0.055 seconds per frame or less. In one embodiment, the total decode and post-decoding (transcribing into ordinal file format or different) processing time (examples 3 and 7) is about 0.07 seconds per frame or less. In one embodiment, the total decode and post-decoding (transcribing into ordinal file format or different) processing time (examples 3 and 7) is about 0.01 seconds per frame or less. In one embodiment, the total decode and post-decoding (transcribing into ordinal file format or different) processing time (examples 3 and 7) is about 0.04 seconds per frame or less. In one embodiment, the total decode and post-decoding (transcribing into ordinal file format or different) processing time (examples 3 and 7) is about 0.035 seconds per frame or less. In one embodiment, the total decode and post-decoding (transcribing into ordinal file format or different) processing time (examples 3 and 7) is about 0.025 seconds per frame or less.

Examples of Some Aspects of Methods and Systems of the Instant Invention for Processing Non-Image Data or Image Data Compressed by Other Compressions (e.g., Zip File, Xml, h.264 Compressed Video, Etc.).

Example 8

Some Aspects of Archive Send Compression

In one embodiment, there is no pre or post conversion process for the Archive Send encoding processing. In one embodiment, the Archive Send encoding can be based on LZMA algorithm and follow the following steps:
a) Buffer creation (Sending machine):
1) In one embodiment, after the initialization, a set of 10 MB buffers are created.
2) In one embodiment, buffers can be used simultaneously for LZMA (e.g., 8 buffers used simultaneously, in parallel).
   i) In one embodiment, if the file size is 10 MB (Megabytes) or above, network transmission will not initiate until a 10 MB buffer is filled.
   ii) In one embodiment, if the file size is below 10 MB, all of the data is put into one buffer.
3. In one embodiment, requests from the recipient machine are processed in similar manner described in example 3.
4. In one embodiment, LZMA processed segments (encoded pieces) are streamed into the buffer.
5. In one embodiment, as soon as the buffer is filled, the transmission starts (see example 9).

Example 9

Some Aspects of Archive Send Transmission Processing

In one embodiment, the Archive Send encoding and transmission occur substantially parallel (in concurrent manner or substantially simultaneously—at least a portion of one process occurs at the same time as another processes is performed). In one embodiment, the Archive Send transmission proceeds similarly as described in examples 3, 5 and 6.

Example 10

Some Aspects of Archive Send Decode Processing

In one embodiment, the Archive Send transmission proceeds similarly as described in examples 4-7. 3. In one embodiment, the received NDBs are decoded from the Archive Send stream into the original file losslessly (bit for bit identical) by using the same LZMA algorithm that is used for encoding (example 8).

Examples of Some Aspects of Initiation Procedure for Invoking Warp Send or Archive Send Methods and Systems of the Instant Invention Example 11

Header Information

In some embodiments, the header information for files can includes: file name, file type, file size, etc. In some embodiments, the header information for videos or a series of images can include: Video codec, audio codec, resolution (width× height), bitrate. In some embodiments, if the file contains a video codec and the video codec is supported by Warp Send, the Warp Send processing (examples 1-7) will begin. In some embodiments, if the file does not contain a video codec or the video codec is not supported by the Warp Send compression, the Archive Send compression (e.g., LZMA, Crush, LZ/lb, etc.) (examples 8-10) will begin. In some embodiments, for both, the Warp Send processing and the Archive Send compression (e.g., LZMA, Crush, LZ/lb, etc.), when a send request is initiated, the processing of the file (pre-compression and compression stages) occurs in parallel (in concurrent manner or substantially simultaneously—at least a portion of one process occurs at the same time as another processes is performed) with the transmission (examples 3, 5-6, and 9).

FIG. 9 shows an embodiment of computer unit that can simultaneously or separately function as both sending and receiving computer unit.

In some embodiments, the instant invention includes a computer-implemented method that includes at least steps of: a) dividing, by a first computer, a computer file into at least one first segment and a first remainder of the computer file; b) compressing, by a second computer, the at least one first segment wherein, in concurrent manner, the second computer compresses the at least one first segment and the first computer divides the first remainder of the computer file into at least one second segment and a second remainder of the computer file; c) sending, by a third computer, the at least one first compressed segment to at least one recipient machine wherein, in concurrent manner, the third computer sends the at least one first compressed segment, the second computer compresses the at least one second segment, and the first computer divides the second remainder of the computer file into at least one third segment and a third remainder of the computer file; d) receiving, by a fourth computer of the recipient machine, the at least one first compressed segment wherein, in concurrent manner, the fourth computer of the recipient machine receives the at least one first compressed segment, the first computer divides the third remainder of the computer file into at least one fourth segment and a fourth remainder of the computer file, the second computer compresses the at least one third compressed segment, and the third computer sends the at least one second compressed segment; e) decompressing, by a fifth computer of the recipient machine, the at least one first received compressed segment wherein, in concurrent manner, the fifth computer of the recipient machine decompresses the at least one first received compressed segment, the first computer divides the fourth remainder of the computer file into at least one fifth segment and a fifth remainder of the computer file, the second computer compresses the at least one fourth segment, the third computer sends the at least one third compressed segment, and the fourth computer of the recipient machine receives the at least one second compressed segment; f) decompressing, by the fifth computer of the recipient machine, the at least one second received compressed segment wherein, in concurrent manner, the fifth computer of the recipient machine decompresses the at least one second received compressed segment and the fourth computer of the recipient machine receives the at least one third compressed segment and wherein the compressing step and the decompressing are synchronized; and g) assembling, by a sixth computer of the recipient machine, the at least one first decompressed segment and the at least one second decompressed segment to reconstruct the computer file wherein, in concurrent manner, the sixth computer of the recipient machine assembles the at least one first decompressed segment and the at least one second decompressed segment, the fifth computer of the recipient machine decompresses the at least one third received compressed segment, and the fourth computer of the recipient machine receives the at least one fourth compressed segment.

In some embodiments, the compressing, by the second computer, is by at least applying at least one lossless algorithm (e.g., LZMA, Crush, Lz/lb, Lagarith, etc.) and wherein decompressing, by the fifth computer of the recipient machine, is by at least applying the at least one lossless algorithm with which the file has been compressed In some embodiments, the instant invention includes a computer-implemented method that includes at least steps of: a) dividing, by a first computer, a computer image file into at least one first segment and a first remainder of the computer file, wherein the at least one first segment comprise a plurality of frames and wherein the computer image file is a video file or an aggregation of static image files; b) compressing, by a second computer, the at least one first segment wherein the compressing includes at least the following steps of: 1) selecting a key frame from the plurality of frames of the at least one first segment, 2) comparing the key frame to each of the remaining frames from the plurality of frames of the at least one first segment, wherein the comparison is performed frame-by-frame based at least in part on: a) actual content of each frame and b) an entire frame basis, 3) encoding, if a standard deviation of all pixel differences in luminance channel between the key frame is less than a pre-determine value, at least one frame of the remaining frames as at least one deference frame, wherein the at least one deference frame identifies at least one difference between the key frame and the encoded frame of the remaining frames, 4) applying lossy compression to the key frame and the deference frames of the plurality of frames of the at least one first segment, wherein the lossy compression is multiscale wavelet compression and comprising Human Visual Systems (HVS) filtering to stretch out tones in the key frame and the deference frames of the plurality of frames of the at least one first segment, and 5) applying, after the lossy compression, a signal to noise ratio processing to the key frame and the deference frames of the plurality of frames of the at least one first segment; and c) decompressing, by a third computer, the plurality of frames of the at least one first segment wherein the decompressing is performed in a inverse order of the compressing steps (c) (1) through (c)(5).

In some embodiments, the instant invention includes a computer-implemented method that includes at least steps of: a) dividing, by a sending computer, a first computer file into at least one first segment and a first remainder of the computer file, wherein the first computer file having a first computer format; b) compressing, by the sending computer, the at least one first segment; c) transmitting, by the sending computer, the at least one first compressed segment to a recipient machine; d) dividing, by a sending computer, the first remainder of the computer file into at least one second segment; e) compressing, by the sending computer, the at least one second segment; f) transmitting, by the sending computer, over a network, the at least one second compressed segment to a recipient computer; g) decompressing, by the recipient computer, the at least one first compressed segment into at least one first decompressed segment; h) transcoding, by the recipient computer, the at least one first decompressed segment into at least one first converted segment having a second computer format; j) decompressing, by the recipient computer, the at least one second compressed segment into at least one second decompressed segment; i) transcoding, by the recipient computer, the at least one second decompressed segment into at least one second converted segment having the second computer format; and k) assembling, by the recipient computer, the at least one first converted segment and the at least one second converted segment into a second computer file having the second computer format, wherein the first computer file and the second computer file have the same content and wherein the first computer format and the second computer format are different. In some embodiments, the steps (h) and (i) are performed in concurrent manner.

In some embodiments, the instant invention includes a computer system that includes at least the following components: a) a first computer that divides a computer file into at least one first segment and a first remainder of the computer file; b) a second computer that compresses the at least one first segment wherein, in concurrent manner, the second computer compresses the at least one first segment and the first computer divides the first remainder of the computer file into at least one second segment and a second remainder of the computer file; c) a third computer that sends the at least one first compressed segment to at least one recipient machine wherein, in concurrent manner, the third computer sends the at least one first compressed segment, the second computer compresses the at least one second segment, and the first computer divides the second remainder of the computer file into at least one third segment and a third remainder of the computer file; d) a fourth computer of the recipient machine that receives the at least one first compressed segment wherein, in concurrent manner, the fourth computer of the recipient machine receives the at least one first compressed segment, the first computer divides the third remainder of the computer file into at least one fourth segment and a fourth remainder of the computer file, the second computer compresses the at least one third compressed segment, and the third computer sends the at least one second compressed segment; e) a fifth computer of the recipient machine that decompresses the at least one first received compressed segment wherein, in concurrent manner, the fifth computer of the recipient machine decompresses the at least one first received compressed segment, the first computer divides the fourth remainder of the computer file into at least one fifth segment and a fifth remainder of the computer file, the second computer compresses the at least one fourth segment, the third computer sends the at least one third compressed segment, and the fourth computer of the recipient machine receives the at least one second compressed segment, wherein, in concurrent manner, the fifth computer of the recipient machine decompresses the at least one second received compressed segment and the fourth computer of the recipient machine receives the at least one third compressed segment, and wherein the compression by the second computer and the decompression by the fifth computer of the recipient machine are synchronized; and g) a sixth computer of the recipient machine that assembles the at least one first decompressed segment and the at least one second decompressed segment to reconstruct the computer file, wherein, in concurrent manner, the sixth computer of the recipient machine assembles the at least one first decompressed segment and the at least one second decompressed segment, the fifth computer of the recipient machine decompresses the at least one third received compressed segment, and the fourth computer of the recipient machine receives the at least one fourth compressed segment. In some embodiments, the second computer applies at least one lossless algorithm (e.g., LZMA, Crush, Lz/lb, Lagarith, etc.) for the compression and wherein the fifth computer of the recipient machine applies the at least one lossless algorithm for the decompression with which the file has been compressed.

In some embodiments, the instant invention includes a computer system that includes at least the following components: a) a first computer that divides a computer image file into at least one first segment and a first remainder of the computer file, wherein the at least one first segment comprise a plurality of frames and wherein the computer image file is a video file or an aggregation of static image files; b) a second computer that compresses the at least one first segment wherein the second computer comprising at least one programmed processor for executing the computer executable program code stored in a memory, wherein the computer executable program code that at least include: 1) code to select a key frame from the plurality of frames of the at least one first segment, 2) code to compare the key frame to each of the remaining frames from the plurality of frames of the at least one first segment, wherein the comparison is performed frame-by-frame based at least in part on: a) actual content of each frame and b) an entire frame basis, 3) code to encode, if a standard deviation of all pixel differences in luminance channel between the key frame is less than a pre-determine value, at least one frame of the remaining frames as at least one deference frame, wherein the at least one deference frame identifies at least one difference between the key frame and the encoded frame of the remaining frames, 4) code to apply lossy compression to the key frame and the deference frames of the plurality of frames of the at least one first segment, wherein the lossy compression is multiscale wavelet compression and comprising Human Visual Systems (HVS) filtering to stretch out tones in the key frame and the deference frames of the plurality of frames of the at least one first segment, and 5) code to apply, after the lossy compression, a signal to noise ratio processing to the key frame and the deference frames of the plurality of frames of the at least one first segment; c) a third computer that decompresses the plurality of frames of the at least one first segment wherein the decompression is performed by the third computer in a inverse order of the compressing steps (c) (1) through (c)(5).

In some embodiments, the instant invention includes a computer system that includes at least the following components: 1) a sending computer having at least one memory region for first storing computer executable program code and at least one first processor for executing the first computer executable program code stored in the at least one first memory region, wherein the first computer executable program code that at least includes: a) code to divide a first computer file into at least one first segment and a first remainder of the computer file, wherein the first computer file having a first computer format, b) code to compress the at least one first segment, c) code to transmit the at least one first compressed segment to a recipient machine, d) code to divide the first remainder of the computer file into at least one second segment, e) code to compress the at least one second segment, and f) code to transmit, over a network, the at least one second compressed segment to a recipient computer; and 2) a recipient computer having at least one second memory region for second storing computer executable program code and at least one second processor for executing the second computer executable program code stored in the at least one second memory region, wherein the second computer executable program code that includes: a) code to decompress the at least one first compressed segment into at least one first decompressed segment, b) code to transcode the at least one first decompressed segment into at least one first converted segment having a second computer format, c) code to decompress the at least one second compressed segment into at least one second decompressed segment, d) code to transcode the at least one second decompressed segment into at least one second converted segment having the second computer format, and e) code to assemble the at least one first converted segment and the at least one second converted segment into a second computer file having the second computer format, wherein the first computer file and the second computer file have the same content and wherein the first computer format and the second computer format are different. In some embodiments, the at least one second processor of the recipient computer executes the codes (c) and (d), in concurrent manner.

In one example, the instant invention is applied for delivery files/data to consumers (e.g., TV/movie streaming, etc). In one example, the instant invention allows for instantly playing functionality in delivery of consumer content.

While a number of embodiments of the present invention have been described, it is understood that these embodiments are illustrative only, and not restrictive, and that many modifications and/or alternative embodiments may become apparent to those of ordinary skill in the art. For example, any steps may be performed in any desired order (and any desired steps may be added and/or any desired steps may be deleted). For example, the instant invention is not limited to compression/encoding/decompression/decoding methods described therein but may include other compression/encoding/decompression/decoding methods. Therefore, it will be understood that the appended claims are intended to cover all such modifications and embodiments that come within the spirit and scope of the present invention.

What is claimed is:

1. A computer system, comprising:
   a plurality of specialized computer machines, wherein computer files are transmitted from one specialized computer machine of the plurality of specialized computer machines to other specialized computer machines of the plurality of specialized computer machines in a concurrent manner such as to result in an optimum synchronization of:
   i) a first computer file of a first computer format being segmented, the segments being compressed and transmitted by at least one specialized sending computer machine of the plurality of specialized computer machines, and ii) the segments being received, decompressed, transcoded into a second computer format, and assembled into a second computer file by at least one specialized recipient computer machine of the plurality of specialized computer machines, wherein the first computer file and the second computer file have the same content and wherein the first computer format is different from the second computer format;

wherein the concurrent manner is achieved by having:

1) the at least one specialized sending computer machine, comprising:

at least one first non-transient memory region for storing first particular computer executable program code and at least one first processor for executing the first particular computer executable program code stored in the at least one first non-transient memory region, wherein the first particular computer executable program code is configured to at least perform the following operations:

a) dividing, within time period T(0), the first computer file into at least one first segment and a first remainder of the computer file, wherein the first computer file having the first computer format;

b) compressing, within time period T(1), the at least one first segment;

c) transmitting, over a network, within time period T(2), the at least one first compressed segment to at least one recipient machine;

d) dividing, within the time period T(1), the first remainder of the computer file into at least one second segment and a second reminder of the computer file;

e) compressing, within the time period T(2), the at least one second segment, and f) transmitting, over the network, at the time period T(3), the at least one second compressed segment to the at least one recipient computer;

g) dividing, within the time period T(2), the second remainder of the computer file into at least one third segment;

h) compressing, within the time period T(3), the at least one third segment;

i) transmitting, over the network, within time period T(4), the at least one third compressed segment to the at least one recipient computer; and 2) the at least one specialized recipient computer machine having at least one second non-transient memory region for storing second particular computer executable program code and at least one second processor for executing the second particular computer executable program code stored in the at least one second non-transient memory region, wherein the second particular computer executable program code is configured to at least perform the following operations:

a) decompressing, within the time period T(3), the at least one first compressed segment into at least one first decompressed segment;

b) transcoding, within the time period T(4), the at least one first decompressed segment into at least one first converted segment having the second computer format;

c) decompressing, within the time period T(4), the at least one second compressed segment into at least one second decompressed segment;

d) transcoding, within time period T(5), the at least one second decompressed segment into at least one second converted segment having the second computer format; and e) assembling, within time period T(6), the at least one first converted segment and the at least one second converted segment into at least one portion of the second computer file having the second computer format;

f) decompressing, within the time period T(5), the at least one third compressed segment into at least one third decompressed segment;

g) transcoding, within the time period T(6), the at least one third decompressed segment into at least one third converted segment having the second computer format;

h) assembling, within time period T(7), the at least one third converted segment with the at least one portion of the second computer file having the second computer format; and wherein the time period T(0) occurs before the time period T(1), wherein the time period T(1) occurs before the time period T(2), wherein the time period T(2) occurs before the time period T(3) wherein the time period T(3) occurs before the time period T(4), wherein the time period T(4) wherein the time period T(5) occurs before the time period T(6), wherein the time period T(6) occurs before the time period T(7).

2. The computer system of claim 1, wherein the at least one specialized sending computer machine applies a LZMA algorithm for the compression and wherein the at least one specialized recipient computer machine applies the LZMA algorithm for the decompression.

3. A computer-implemented method, comprising:

specifically programming a plurality of specialized computer machines, wherein computer files are transmitted from one specialized computer machine of the plurality of specialized computer machines to other specialized computer machines of the plurality of specialized computer machines in a concurrent manner such as to result in an optimum synchronization of:

i) a first computer file of a first computer format being segmented, the segments being compressed and transmitted by at least one specialized sending computer machine of the plurality of specialized computer machines, and ii) the segments being received, decompressed, transcoded into a second computer format, and assembled into a second computer file by at least one specialized recipient computer machine of the plurality of specialized computer machines, wherein the first computer file and the second computer file have the same content and wherein the first computer format is different from the second computer format;

wherein the concurrent manner is achieved by:

1) specifically programming the at least one specialized sending computer machine to perform at least the following:

a) dividing, within time period T(0), the first computer file into at least one first segment and a first remainder of the computer file, wherein the first computer file having the first computer format;

b) compressing, within time period T(1), the at least one first segment;

c) transmitting, over a network, within time period T(2), the at least one first compressed segment to at least one recipient machine;

d) dividing, within the time period T(1), the first remainder of the computer file into at least one second segment and a second reminder of the computer file;

e) compressing, within the time period T(2), the at least one second segment, and f) transmitting, over the network, at the time period T(3), the at least one second compressed segment to the at least one recipient computer;

g) dividing, within the time period T(2), the second remainder of the computer file into at least one third segment;
h) compressing, within the time period T(3), the at least one third segment;
i) transmitting, over the network, within time period T(4), the at least one third compressed segment to the at least one recipient computer; and
2) specifically programming the at least one specialized recipient computer machine to perform at least the following:
a) decompressing, within the time period T(3), the at least one first compressed segment into at least one first decompressed segment;
b) transcoding, within the time period T(4), the at least one first decompressed segment into at least one first converted segment having the second computer format;
c) decompressing, within the time period T(4), the at least one second compressed segment into at least one second decompressed segment;
d) transcoding, within time period T(5), the at least one second decompressed segment into at least one second converted segment having the second computer format;
e) assembling, within time period T(6), the at least one first converted segment and the at least one second converted segment into at least one portion of the second computer file having the second computer format;
f) decompressing, within the time period T(5), the at least one third compressed segment into at least one third decompressed segment;
g) transcoding, within the time period T(6), the at least one third decompressed segment into at least one third converted segment having the second computer format;
h) assembling, within time period T(7), the at least one third converted segment with the at least one portion of the second computer file having the second computer format; and
wherein the time period T(0) occurs before the time period T(1), wherein the time period T(1) occurs before the time period T(2), wherein the time period T(2) occurs before the time period T(3), wherein the time period T(3) occurs before the time period T(4), wherein the time period T(4) occurs before the time period T(5), wherein the time period T(5) occurs before the time period T(6), wherein the time period T(6) occurs before the time period T(7).

4. The computer-implemented method of claim 3, wherein the steps of compressing are performed by at least applying a LZMA algorithm and wherein the steps of decompressing are performed by at least applying the LZMA algorithm.

* * * * *